(12) United States Patent
Aliahmad

(10) Patent No.: US 11,821,401 B2
(45) Date of Patent: Nov. 21, 2023

(54) HYDRO-WAVE POWER ENERGY HARNESSING DEVICE AND METHOD OF OPERATION THEREOF

(71) Applicant: Mirza Aliahmad, South Ozone Park, NY (US)

(72) Inventor: Mirza Aliahmad, South Ozone Park, NY (US)

( * ) Notice: Subject to any disclaimer, the term of this patent is extended or adjusted under 35 U.S.C. 154(b) by 36 days.

(21) Appl. No.: 17/477,350

(22) Filed: Sep. 16, 2021

(65) Prior Publication Data

US 2022/0090574 A1    Mar. 24, 2022

Related U.S. Application Data

(60) Provisional application No. 63/080,240, filed on Sep. 18, 2020.

(51) Int. Cl.
*F03B 13/00* (2006.01)
*F03B 13/18* (2006.01)

(52) U.S. Cl.
CPC .... *F03B 13/1845* (2013.01); *F05B 2260/402* (2013.01)

(58) Field of Classification Search
CPC .......... F05B 2240/917; F05B 2260/402; F05B 2260/4031; F05B 2240/93; F05B 2260/40312; F05B 2260/503; F05B 2260/505; F03B 13/1865; F03B 13/1845; F03B 13/1815
USPC ...................................................... 290/42, 53
See application file for complete search history.

(56) References Cited

U.S. PATENT DOCUMENTS

| | | | | |
|---|---|---|---|---|
| 2,179,537 A | * | 11/1939 | Zoppa | F03B 13/185 290/42 |
| 4,145,885 A | * | 3/1979 | Solell | F03B 13/1855 60/507 |
| 10,378,504 B2 | | 8/2019 | Blodgett et al. | |
| 10,458,385 B2 | | 10/2019 | Blodgett et al. | |
| 10,634,113 B2 | | 4/2020 | Sheldon-Coulson et al. | |
| 2006/0028026 A1 | * | 2/2006 | Yim | F03B 13/1815 290/53 |

(Continued)

FOREIGN PATENT DOCUMENTS

| | | | | |
|---|---|---|---|---|
| CA | 2808614 A1 | | 5/2013 | |
| CA | 2839176 A1 | * | 5/2013 | ......... F03B 13/1845 |

(Continued)

OTHER PUBLICATIONS https://www.youtube.com/watch?v=HrVXU2DZ_MM; Wave of the Future: Clean Energy by Eco Wave Power; Nov. 10, 2019.

(Continued)

*Primary Examiner* — Julio C. Gonzalez

(57) ABSTRACT

A wave power harnessing device which may include a base configured to support at least one guide opening; first and second shafts which may be situated apart and parallel from each other and to the base; first and second sprockets coupled to the first and second shafts, respectively, the first and second sprockets may each include an overrunning clutch configured to rotate the shaft coupled thereto in a single direction; a force transmitting member (FTM) may be coupled to the first and second sprockets; at least one buoy drive shaft (BUDS) may be coupled to the FTM and to at least one buoy; and/or a generator coupled to at least one of the first and second shafts and which may be configured to generate an electrical power.

19 Claims, 29 Drawing Sheets

(56) References Cited

U.S. PATENT DOCUMENTS

2016/0032887 A1    2/2016  Patton
2019/0323477 A1    10/2019 Blodgett et al.

FOREIGN PATENT DOCUMENTS

KR    20100023655 A    3/2010
KR     101629222 B1    6/2016

OTHER PUBLICATIONS https://www.youtube.com/watch?v=vCwoQob6JYE; Weptos Offshore #1; Weptos Offshore #1 launch and test; Mar. 19, 2019.
https://www.youtube.com/watch?v=DsK3yKJyoyM; Weptos Offshore #1; Weptos Offshore #1 outstanding performance in real sea test; Mach 19, 2019.
ittps://www.youtube.com/watch?v=c633wEaNc18; Eco wave Power Gibraltar; Dec. 13, 2018.
https://www.youtube.com/watch?v=_FSEQ3D7jG8; UCF Senior Design 2016: Ocean Wave Power Generator; Adam Alexander; Nov. 30, 2016.
https://www.youtube.com/watch?v=W_TaauPpELM; Wave Energy, David Leb Founder and Ceo Eco Wave Power; Ecowavepower captures energy from waves; Dec. 7, 2015.
https://www.youtube.com/watch?v=sVQM2QKxM4E; Wave Star—wave energy test machine in operation; Sep. 3, 2010.
https://www.youtube.com/watch?v=1UxgYOB20QE; Wave Generator, Ocean wave generator, Simple wave generator. Wave power Generate electricity from ocean waves; Dec. 6, 2009.
https://www.youtube.com/watch?v=_KX_mbo7pXA; Wave Energy Buoy—Original Generator; Michael Buelsing; May 12, 2009.

* cited by examiner

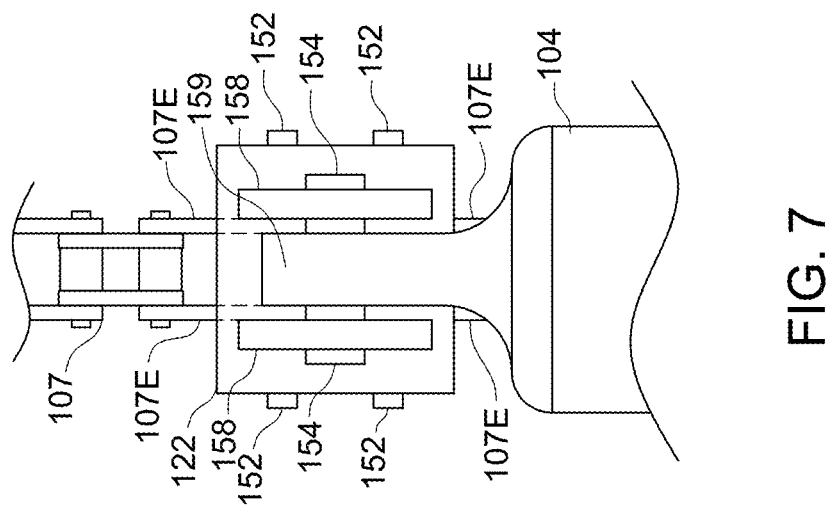
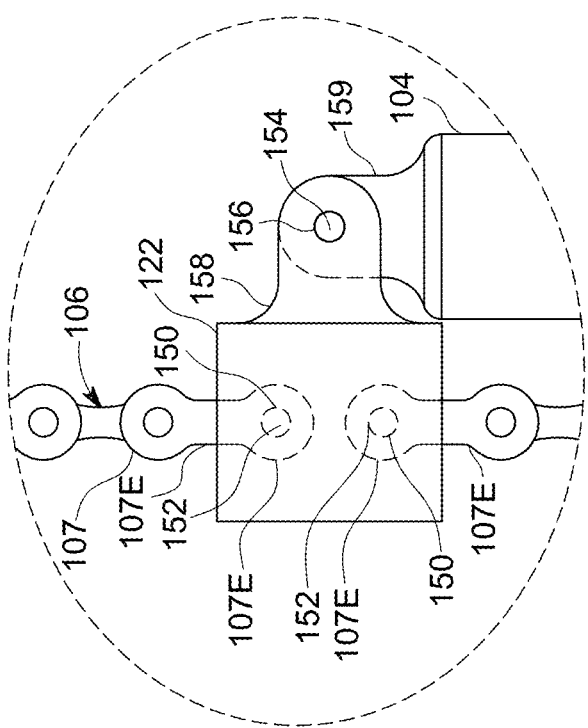
FIG. 5
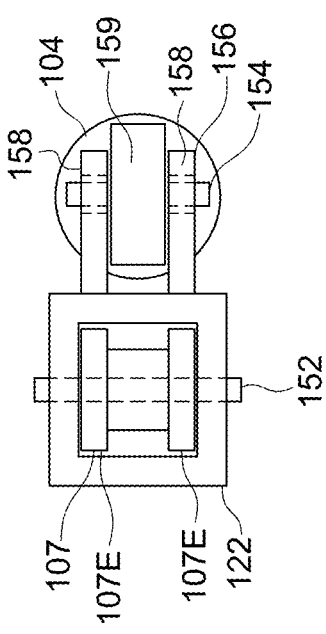
FIG. 6
FIG. 7

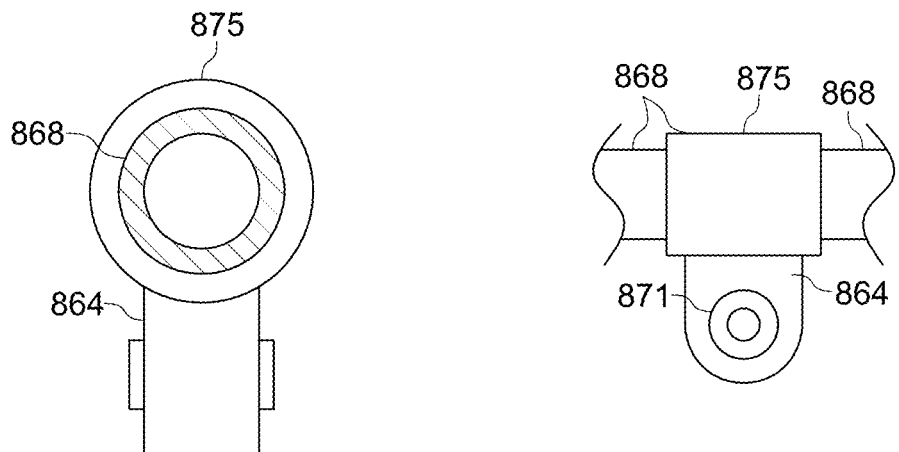
FIG. 10
FIG. 11
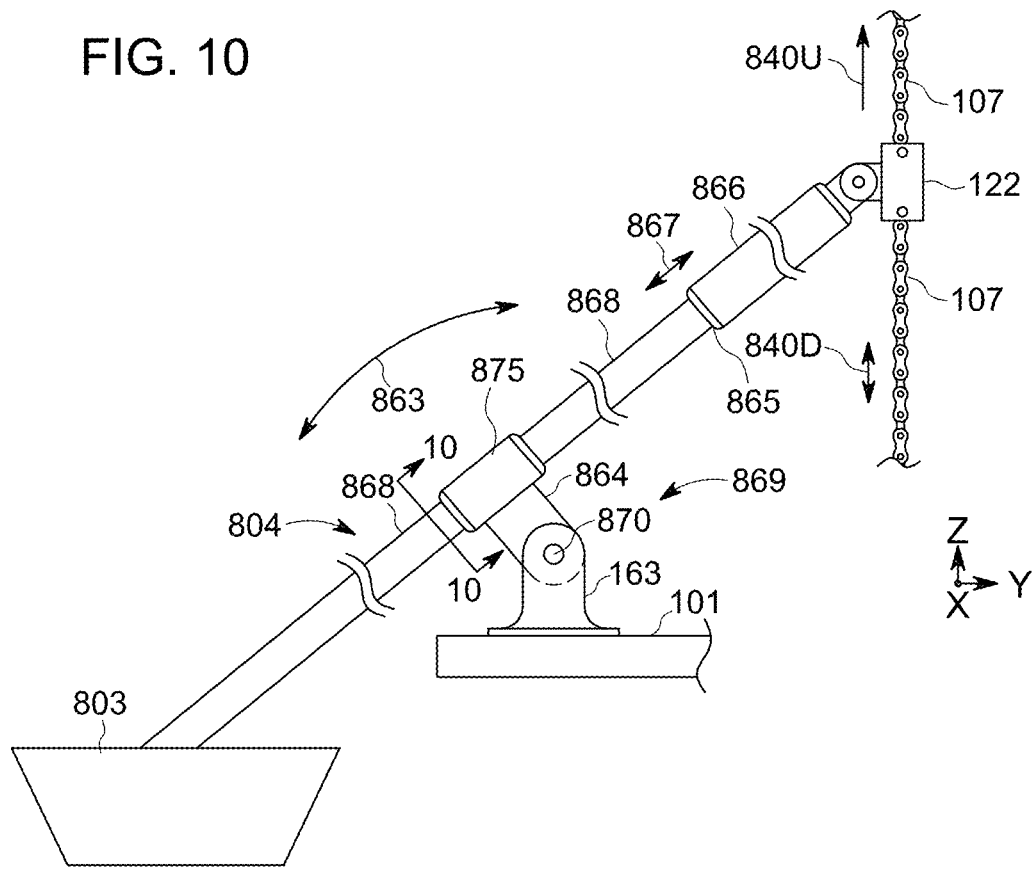
FIG. 9

HYDRO-WAVE POWER ENERGY HARNESSING DEVICE AND METHOD OF OPERATION THEREOF

CROSS REFERENCE TO RELATED APPLICATIONS

This application claims priority to U.S. Provisional Application Ser. No. 63/080,240 filed on Sep. 18, 2020, the entire contents of which is incorporated herein by reference in its entirety.

FIELD OF THE PRESENT SYSTEM

The present system relates to a renewable energy generation system and, more particularly, relates to a hydro-wave-power energy harnessing system which generates electrical energy and a method of operation thereof.

BACKGROUND OF THE PRESENT SYSTEM

Recently, there has been an increased interest in renewable energy systems which harness energy from renewable energy sources. These systems can reliably generate energy at low-cost energy with little to no carbon footprint. Common renewable energy sources include wind, solar, hydro-power, and wave energy (e.g., wave power), the latter of which generates energy using waves such as ocean waves and the like. Wave energy is typically harnessed in coastal regions but has the added advantage that it can be harnessed in remote areas where it may be difficult to generate electricity using other methods such as solar and wind power. For example, in remote polar-regions, conventional mains electricity from fossil-fueled power plants may be unavailable and many renewable energy sources may be ill fitted for the environment. For example, there may be insufficient sunlight for solar power generation, it may be too cold to store electricity in batteries, or the weather may be too extreme to generate electricity using wind power. Additionally, because of the temperature and terrain, hydro-power may be unsuitable for this environment. Thus, wave energy may be the ideal power source for coastal polar-regions. However, conventional wave energy generators are expensive, require undesirable maintenance, and are too complex and difficult to scale. Accordingly, embodiments of the present system overcome these and other disadvantages of conventional wave energy generators.

SUMMARY OF THE PRESENT SYSTEM

The system(s), device(s), method(s), arrangements(s), user interface(s), computer program(s), processes, etc. (hereinafter each of which will be referred to as system, unless the context indicates otherwise), described herein address problems in prior art systems. Embodiments of the present system may provide a system and method for generating power using a wave power harnessing device which may include a base configured to support at least one guide opening; first and second shafts which may be situated apart and parallel from each other and to the base; first and second sprockets coupled to the first and second shafts, respectively, the first and second sprockets each having an overrunning clutch configured to rotate the shaft coupled thereto in a single direction; a force transmitting member (FTM) coupled to the first and second sprockets; at least one buoy drive shaft (BUDS) coupled to the FTM and to at least one buoy; and/or a generator coupled to at least one of the first and second shafts and configured to generate an electrical power.

A guide bearing may be situated in the at least one guide opening configured to provide for telescopic motion of the BUDS. It is envisioned that the BUDS may be oriented in a substantially vertical position and may telescope relative to the base. It also envisioned that a drive coupler (DC) configured to couple the BUDS to the FTM may be provided. The guide bearing and the drive coupler are configured to constrain the BUDS to a substantial vertical orientation. It is also envisioned that the first and second sprockets and the BUDS may be substantially parallel with each other. The FTM may include at least one of a chain, a belt, and a cable, a rope, etc. A controller may be provided and may include a battery management portion for controlling storage of the electrical power in a battery. A cooling system for the battery may also be provided. The battery may include one or more cells. It is envisioned that the DC and the FTM may form a loop about the first and second shafts.

In accordance with yet other embodiments of the present system, there is provided a wave power harnessing device that may include one or more of: at least one buoy drive shaft (BUDS) including proximal and distal ends; a buoy may be coupled to the distal end of the at least one BUDS; a base may include at least one guide for pivotally or telescopically locating at the least one of the at least one BUDS; first and/or second shafts may be provided situated apart from, and substantially parallel to, each other and to the base; first and second sprockets may be coupled to first and second shafts, respectively, the first and second sprockets may each include an overrunning clutch configured to engage in the same direction; a flexible force transmitting member (FTM) may be provided to couple the first and second sprockets to each other; and/or a coupler may be provided and configured to couple the FTM to the proximal end of the least one BUDS.

It is envisioned that a generator may be coupled to one of the first and second shafts via a transmission, and may be configured to generate electrical power. The generator may have an axis which may be inclined with one or more of the shafts and may have separate or common bearings. It is also envisioned that the system may include a controller and a battery for storing the generated electrical power. It is envisioned that the BUDS may further include first and second portions, the first portion at the proximal end and the second portion at the distal end. In accordance with some embodiments, the BUDS may further include a slip joint that may be configured to couple the first and second portions to each other and may be further configured to provide telescopic movement of the first and second parts of the BUDS relative to each other. It is envisioned that the flexible FTM may include at least one of a chain, belt, and cable.

In accordance with embodiments of the present system, there is provided a wave power harnessing device, which may include one or more of: a base; first and second shafts situated apart and parallel from each other and the base; first and second sprockets coupled to the first and second shafts, respectively, the first and second sprockets each having an overrunning clutch configured to rotate the shaft coupled thereto in a single direction; a flexible force transmitting member (FTM) coupled to the first and second sprockets; first and second hydraulic cylinders hydraulically coupled to each other; a buoy coupled to the first hydraulic cylinder; and/or a coupler for coupling the FTM to the second hydraulic cylinder such that when the second hydraulic cylinder cycles through an expansion and contraction cycle, the chain may oscillate in two opposite directions.

It is envisioned that the flexible FTM may constrains motion of the second hydraulic cylinder and may include at least one of a chain, belt, and cable. A generator may be coupled to one of the first and second shafts and may be configured to generate power. In accordance with embodiments of the present system, there may be provided a at least one battery and/or a controller which may be configured to control the overall operation of the system and may, for example, control power flow from the generator to, and/or from, the at least one battery.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. In the drawings:

FIG. 5 shows a detailed side view of a portion of the system illustrating coupling of the Drive Coupler (DC) and Buoy Drive Shaft (BUDS) taken along line 5 of FIG. 3 in accordance with embodiments of the present system;

FIG. 6 shows a top view of a portion of the system of FIG. 5 in accordance with embodiments of the present system;

FIG. 7 shows a front view of a portion of the system of FIG. 5 in accordance with embodiments of the present system;

FIG. 9 shows a side view of a portion of a BUDS coupled to the base in accordance with embodiments of the present system;

FIG. 10 shows a cross sectional view of a portion of a BUDS taken along lines 10-10 of FIG. 9 in accordance with embodiments of the present system;

FIG. 11 shows a side view of a portion of the BUDS in accordance with embodiments of the present system;

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the entire scope of the present system. In the accompanying drawings, like reference numbers in different drawings may designate similar elements. The term and/or and formatives thereof should be understood to mean that only one or more of the recited elements may need to be suitably present (e.g., only one recited element is present, two of the recited elements may be present, etc., up to all of the recited elements may be present) in a system in accordance with the claims recitation and in accordance with one or more embodiments of the present system.

Spatially relative terms such as "upwards," "downwards," "under," "below," "lower," "over," "upper," and/or the like, are used for ease of description to explain the positioning of one element relative to a second element. These terms may be intended to encompass different orientations of devices of the present system in addition to different orientations than those depicted in the figures. Further, terms such as "first," "second," "one," "the other," and/or the like, may be used to describe various elements, regions, sections, etc. and are also not intended to be limiting. Like terms may refer to like elements throughout the description.

A Linear Drive System (LDS)

Figure 1:
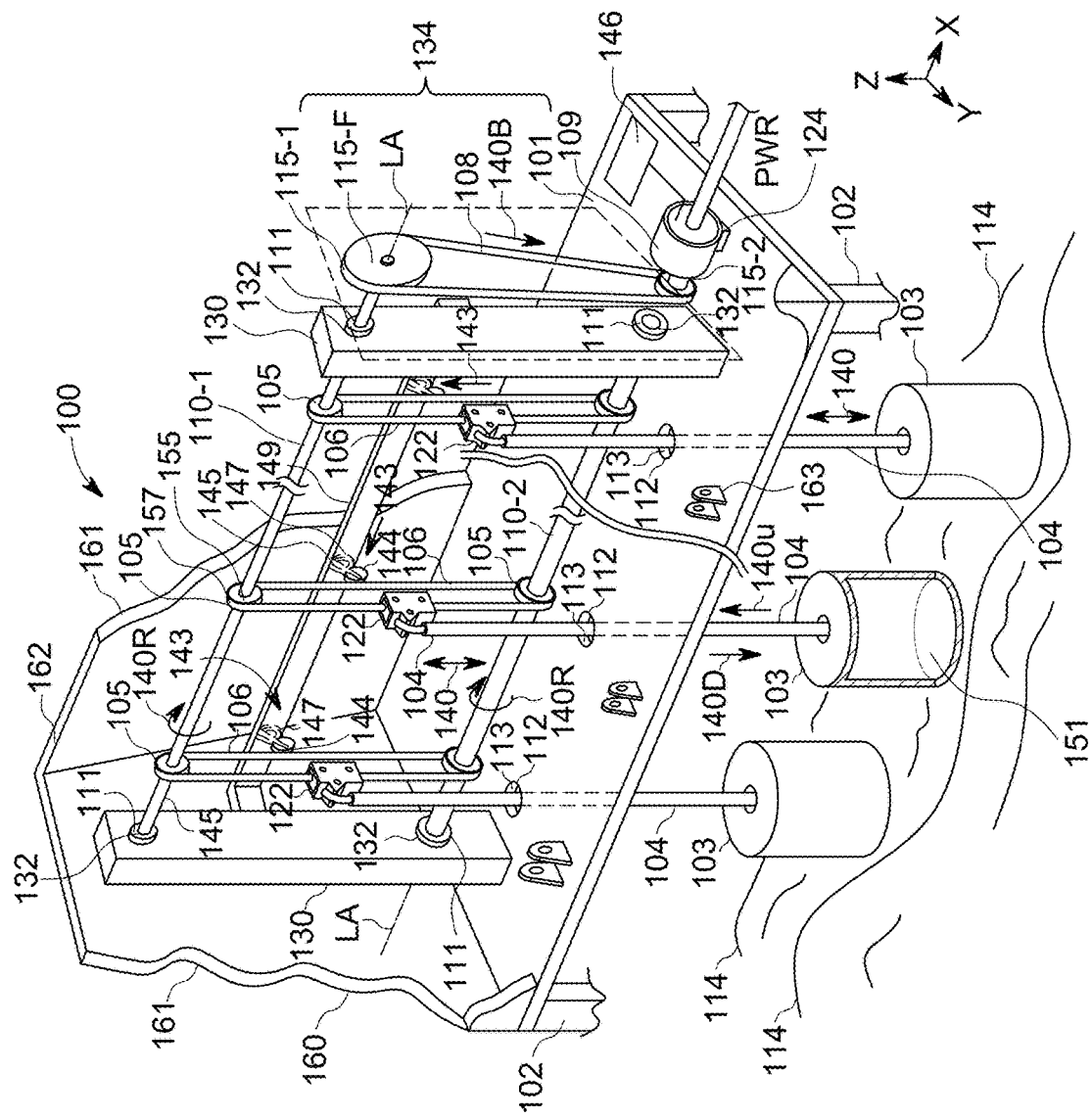
FIG. 1 shows a front side perspective view of a portion of a Wave-Power Generator System (hereinafter WPGS or system) in accordance with embodiments of the present system.

FIG. 1 shows a front side perspective view of a portion of a wave-power generator system (hereinafter WPGS or system) 100 in accordance with embodiments of the present system. The WPGS 100 may include a base 101 (or platform) which may support first and second shafts 110-1 and 110-2 (generally 110-x), respectively, one of which may drive the other shaft 110-x via a transmission 134. The transmission 134 may include a fixed, a single speed, a multi-speed, or a variable speed transmission that may be passively or actively via a controller of the system. For example, the variable transmission may include a passively or automatically controlled continuously variable transmission (CVT) if desired. In accordance with embodiments of the present system, the transmission 134 may include first and second pulleys 115-1 and 115-2 (generally pulleys 115-x), respectively, coupled by a force transmitting member (FTM) such as a chain, cable or belt 108 coupling the first and second pulleys 115-1 and 115-2, respectively. For the sake of clarity, reference may be made to a belt 108, however it should be understood that other FTMs such as chains, cables, etc., may also be used. In some embodiments, the transmission may include a direct drive transmission. In yet other embodiments, the transmission may include gears which may be fixed or selected.

The pulleys 115-x may be configured to match the FTM coupled thereto. Thus, pulleys may be employed if the FTM is a belt and a sprocket may be used if the FTM is a chain. For example, in accordance with some embodiments of the present system, the pulleys 115-x may include sprockets 105 having teeth which may engage the belt 108 (e.g., cogged belt) or a chain. In some embodiments, the transmission 134 may include gears that may drive each other, and selectively activated coupler such as a clutch (mechanically or electronically controlled by a controller of the system) or a hydraulic coupling (e.g., a torque converter).

One of the pulleys 115-x may be overdriven or underdriven by the other pulley 115-x or driven at a one-to-one ratio (e.g., 1:1). In some embodiments, the transmission 134 may include an automatic or manual transmission which may have one or more ratios. In yet other embodiments, the transmission may include a direct drive transmission.

A flywheel may be coupled to one or more of the first and second shafts 110-1 and 110-2, respectively. In some embodiments, the flywheel may be integrated with the pulleys 115-x such as the pulley 115-1 and may be referred to as a flywheel 115-F. The flywheel 115-F may be configured to store rotational inertia for later use and/or to dampen vibrations (e.g., dampen harmonics) of the system at a desired frequency or range of frequencies to reduce shock on the system.

One or more of the shafts 110-x such as the first shaft 110-1 (e.g., the driving shaft) may be coupled to a generator 109 via the transmission 134 so as to drive the generator. The generator 109 may include a power output (PWR) and a control line (CNTRL) through which power may be output and a controller of the system may communicate with and/or control the generator 109. The generator 109 may include a power conditioner and/or storage (e.g., batteries, capacitors, etc.) as may be desired and may output alternating current or direct current power with any suitable waveform (e.g., sine wave, pulse width modulated (PWM)) with any desired frequency (e.g., 60 Hz, 50 Hz, etc.) and/or amplitude. In some embodiments, a positioner may be provided to adjust a position of the generator 109 along or about one or more axes so as to adjust alignment and/or tension of the belt 108. In yet other embodiments, one or more tensioners may be provided to tension the belt 108 as may be desired. The generator 109 may include any suitable power generation device or devices such as a generator, an alternator, etc. In some embodiments, it is envisioned that the transmission 134 includes a clutch to disengage the generator 109 from the driving shaft 110-x. For the sake of clarity only a single generator is discussed. However, it should be understood that the generator may be local or distributed throughout the system.

The base 101 may support one or more of the shafts 110-x via shaft supports 130 coupled thereto. For the sake of clarity, the base 101 may be illustrated as a substantially flat platform made from any suitable material or materials and may be shaped and/or sized as desired. The base 101 may include one or more cutouts, notches, and/or openings 112 configured to receive portions of the system such as buoy drive shafts (BUDSs) 104. Slide bearings (SBs) 113 may be in communication with a corresponding BUDS 104 to (e.g., telescopically) guide the corresponding BUDS 104 so as to maintain a position and/or orientation of the corresponding BUDS 104 relative to other portions of the system 100. The SBs 113 may include roller and/or plain bearings (e.g., low-friction surfaces such as Teflon, etc., etc.). In some embodiments, the SBs 113 may be situated in corresponding openings 112 and may be configured so as to provide for the motion of a corresponding BUDS 104 during use. Seals may be provided in the openings 112 to form a water resistant seal as may be desired. In some embodiments, the SBs 113 may be mounted at an outer periphery of the base 101. In some embodiments, tabs or other elements may be provided to guide a corresponding BUDS 104.

In some embodiments, the base 101 may include supports such as flanges 163 aligned with the sprockets 105. The sprockets 105 may be configured to rotatably couple a BUDS such that the buoys attached to the BUDS may be cantilevered from the base 101 and may rotate relative to the base 101.

The SB bearings 113 and drive coupler (DC) 122 may be operative to maintain a desired orientation of the corresponding buoy drive shaft (BUDS) 104 such that the BUDS 104 may telescope in a vertical orientation (relative to horizontal and/or the base) in the present embodiments. However, in yet other embodiments, the BUDS 104 may have other orientations.

In some embodiments, the base 101 may include a plurality of couplers, flanges, brackets, alignment portions, and/or openings for mounting, supporting, and/or aligning one or more of the DCs, BUDSs, hydraulic cylinders, generators, motors, shaft supports, etc. in accordance with various embodiments of the present systems. Accordingly, it is envisioned that in some embodiments a single type of base may be employed to realize one or more embodiments of the present system. In some embodiments, the base 101 may have repeated patterns for mounting one or more BUDSs, etc.

The shaft supports 130 may be mounted apart from each other so as to support the shafts 110-x. In the present embodiments the shaft supports 130 may be configured in a vertical orientation substantially parallel to, and situated apart from, each other. In yet other embodiments, the shaft supports 130 may be configured in a horizontal orientation substantially parallel to, and situated apart from, each other. In yet other embodiments, the shaft supports 130 may be configured in other orientations (e.g., 45 degrees to vertical, etc.) substantially parallel to, and situated apart from, each other.

In the present embodiments, the shafts 110-x may be configured in a substantially horizontal orientation substantially parallel to, and situated apart from, each other. However, in yet other embodiments, the shafts 110-x may be configured in a vertical orientation substantially parallel to, and situated apart from, each other.

Bearings 111 may be configured to couple the shafts 110-x to the corresponding shaft supports 130 and may include any suitable bearing or bearings such as plain bearings, roller bearings, ball bearings, etc., as may be desired so as to provide for the rotation of the corresponding shafts 110-x during use. In some embodiments, the bearings 111 may be situated in corresponding openings and may include one or more optional thrust bearings to prevent or reduce axial play of the supported shafts 110-x.

In some embodiments, it is envisioned that the shaft supports 130 may include openings 132 each configured to receive a bearing 111 and configured to receive at least a portion of one of the shafts 110-x. The shafts 110-x may pass partially and/or fully through one or more of these openings. In yet other embodiments, the shaft supports 130 may have a surface configured to receive a corresponding bearing. Thus, it is envisioned that the bearings 111 may be surface mounted in some embodiments. In some embodiments, it is envisioned that the shaft supports 130 may be coupled to each other using one or more cross members that may extend between and be coupled to the shafts supports 130.

Each of the shafts 110-x may be coupled to a plurality of pulleys, cogs, or sprockets 105 (hereinafter sprockets 105 for the sake of clarity) that may be aligned with each other in pairs between each of the shafts 110-x. Any suitable drive FTM (DFTM) 106 may couple the first and second shafts 110-1 and 110-2 together so as to transmit a force from one of the first and second shafts 110-x to the other. This force may cause rotation of at least one of the shafts 110-x about it longitudinal axis (LA). For the sake of clarity, it will be assumed that the DFTM 106 may include, for example, a chain 107 which couples corresponding pairs of the sprockets 105 (e.g., a sprocket pair) about which it may wrap as illustrated. It should be understood that other DFTMs such as belts, rods, etc. may be substituted for the chain 107. Further, when using other DFTMs such as a belt, the sprocket may be replaced with a pulley that may or may not include cogs.

A tensioner, such as a tensioner assembly 143, and configured to provide a force to tension a corresponding chain 107 of the chains 107. In some embodiments, the tensioner assembly 143 may include a sprocket 144 coupled to a cross support 149 via an arm 145 which may be biased via a biasing member such as spring 147 to provide a force to tension the corresponding chain 107. More particularly, the arm 145 may be hingedly coupled to the cross support 149 and may be biased by the biasing member. In some embodiments, the tensioner assembly may include a sprocket that may be fixed in position so as to provide a force to tension a corresponding chain.

Each of the DFTM 106 may include a DFTM coupler (DC) 122 which may be configured to couple a BUDS 104 to the DFTM 106. The DC 122 may be coupled to the BUDS 104 fixedly or may employ one or more joints having one or more degrees of travel and/or rotation.

One or more buoys 103 may each be buoyant and may be configured to transmit a force from the corresponding buoy 103 to the DFTM 106 via a corresponding BUDS 104. Each BUDS 104 may be coupled to the corresponding buoy 103 using any suitable method such as a threaded coupling, pins, an interference (e.g., friction) coupling, adhesives, bonds, rivets, springs, etc. In some embodiments, the coupling may provide for a limited amount a play of the buoy 103 along or about one or more axes relative to the BUDS 104 to which it is coupled. This may reduce shock on the system when subject to extreme wave conditions.

The system 100 may include an enclosure such as an enclosure 160 which may protect portions of the system from exposure to the elements. For example, the enclosure 160 may include one or more walls 161 and a roof 162 which may partially or fully enclose the upper portion of the system 100. In some embodiments, the enclosure 160 may include a shipping container.

Figure 2:
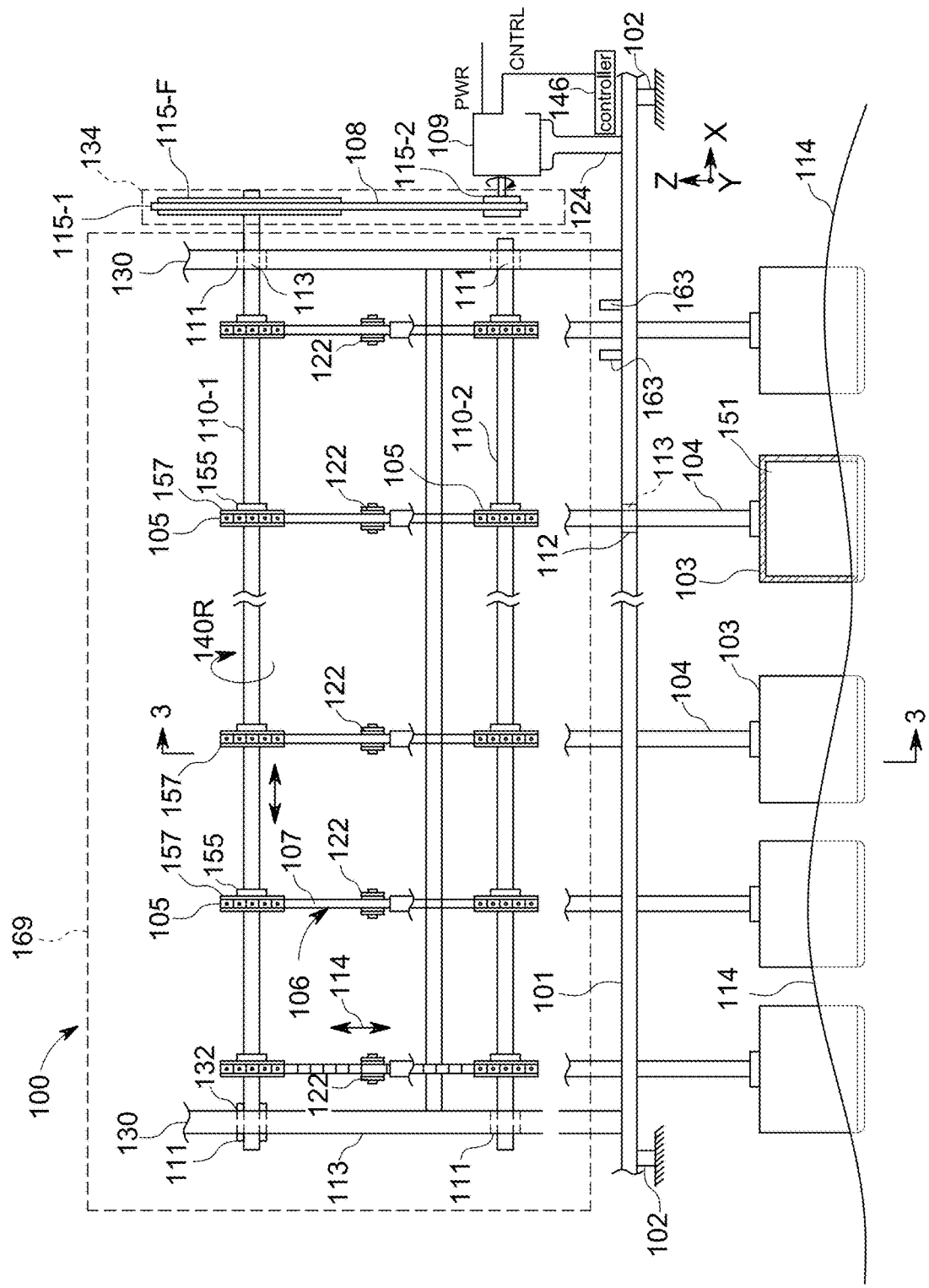
FIG. 2 shows a partially cutaway front view of a portion of the system of FIG. 1 in accordance with embodiments of the present system.

FIG. 2 shows a partially cutaway front view of a portion of the system 100 of FIG. 1 in accordance with embodiments of the present system. The generator 109 may include any suitable generator for power generation systems and may be mounted upon a pedestal 124 which may provide for adjustment of position and/or orientation of the generator 109.

A controller 146 may be local and/or distributed throughout the system 100 and may control one or more portions of the system 100 such as the generator 109, the transmission 134, and/or clutches via one or more control lines (CNTRL). For example, the controller 146 may control one or more portion of the system using control signals transmitted via the control lines (CNTRL). The rear view may be similar and is not shown for the sake of clarity. The BUDS 104 may be hollow or solid and may be formed from any suitable material or materials such as carbon fiber, fiberglass, aluminum, steel, a polymer, stainless steel, etc. In some embodiments, a locking mechanism may be provided to lock one or more of the BUDSs 104 in a desired position such as may be required for servicing of the system 100 and/or as needed during extreme (water and/or air) turbulence such as during a storm.

Each buoy 103 may include a cavity 151 situated therein. In some embodiments, this cavity may be filled with a buoyant material such as foam and/or the like. In some embodiments, the buoy 103 may include a honeycomb material placed within its cavity 151. The one or more optional supports 102 may be configured to support the base 101 in a desired position and/or orientation and may be coupled to the base 101. The supports 102 may be situated to any side of the base 101 as may be required. In some embodiments, the supports 102 may be adjustable.

One or more of the sprockets 105 may include a rotor 157 in communication with the chain 107 and which may be coupled to a hub 155 via an overrunning clutch (e.g., a freewheel, a sprag clutch or other one-way freewheel clutches, etc.) such that the rotor 157 may only drive the hub 155 in a selected direction (e.g., in the direction of arrow 140R) and may overrun in the other direction (e.g., in the reverse direction). This is illustrated in greater detail in FIG. 14A which shows a detailed front view of a portion of the sprocket 105 and shaft 110-1 coupled thereto in accordance with embodiments of the present system including an overrunning clutch 105A. In some embodiments, the overrunning clutch may be passively or actively engaged. For example, a controller of the system may engage the overrunning clutch in accordance with sensor information.

With reference to FIG. 2, that portion of the system 100 that includes at least the first and/or second shafts 110-1 and 110-2, respectively, the sprockets 105, and the DFTM 106 may be referred to as a drive portion (DP) 169. In the present embodiments, the DP 169 is oriented in a vertical position, however, other orientations and/or positions such as horizontal are also envisioned.

In some embodiments, a direction of lockup (e.g., the lockup orientation) of the overrunning clutch may be reversed as desired by a user and/or a controller of the system. The orientation may vary for packaging. In some embodiments, one or more brakes or force attenuators may be provided to slow or stop one or more portions of the system such as the shafts 110-x, the generator 109, etc. The one or more brakes may be controlled by a controller of the system, which may be the same generation controller 146 or an additional controller, and may include hydraulically, mechanically, and/or electronically activated and/or controlled brakes.

Sensors may be provided to sense one or more parameters of the system and generate corresponding sensor information such as speed information of one or more parts of the system such as revolutions per minute (RPM) of one or more of the shafts 110-x, the generator 109, etc. The controller analyzes the sensor information to detect various operating conditions of the system. When abnormal conditions such as slippage are detected, the controller may generate and/or send a notification indicating such to one or more user interfaces of the system via any suitable wired or wireless communication systems.

Figure 3:
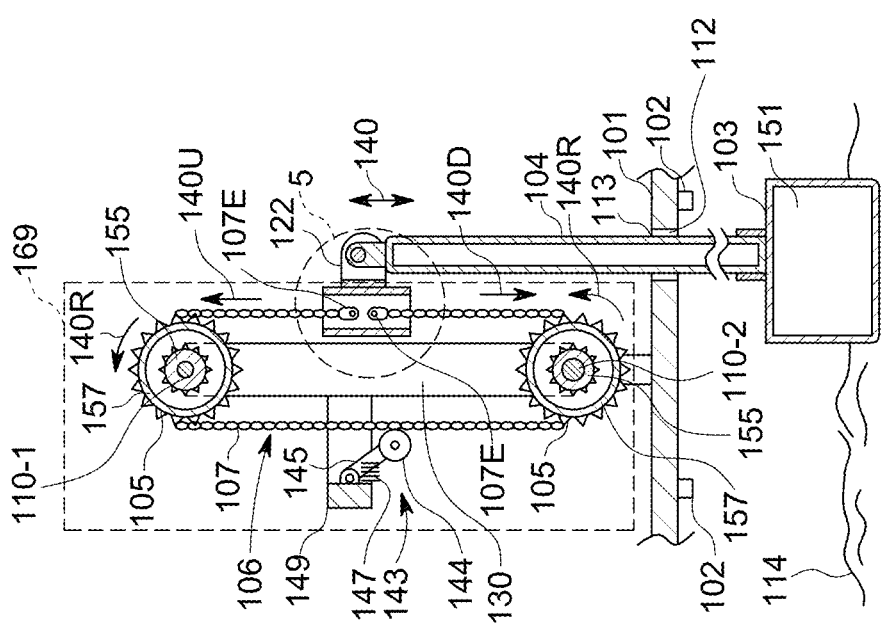
FIG. 3 shows a partially cutaway front view of a portion of the system taken along lines 3-3 of FIG. 2 in accordance with embodiments of the present system.

FIG. 3 shows a partially cutaway front view of a portion of the system 100 taken along lines 3-3 of FIG. 2 in accordance with embodiments of the present system. The buoy 103 may be hollow and coupled to the BUDS 104 and may be buoyant in water. The BUDS 104 may be coupled to, and situated between, the buoy 103 and the DC 122. The DC 122 may couple ends of the DFTM 106 such as ends 107E of the chain 107 where, as illustrated by up arrow 140U, force (or motion) may be transferred to a corresponding DFTM 106 (chain 107) via the BUDS 104 and DC 122 thus driving the sprockets 105 in communication with the DFTM 106.

The tensioner assembly 143 is shown with the sprocket 144 coupled to the cross support 149 via the arm 145 which may be biased by any suitable biasing member such as the spring 147 to provide a force to tension the chain 107 (or other DFTM 106).

One or more of the sprockets 105 may include overrunning clutches configured such that a force from the DFTM 106 may rotate the corresponding sprockets substantially in one direction (e.g., in the direction of arrow 140R and not in the other direction). Any suitable overrunning clutches may be employed. For example, the sprockets 105 may include the rotor 157 coupled to a hub 155 via an overrunning clutch (e.g., a freewheel, a sprag clutch, etc. which may lock in a first rotational direction and open in the other or reverse rotational direction) such that the rotor 157 may only drive the hub 155 (e.g., rotate the hub 155) in first direction about its axis (e.g., in direction illustrated by arrow 140R) and may overrun in the opposite (i.e., reverse) direction (e.g., in the direction opposite to 140R). The sprockets 105 may be coupled to the DFTM 106. When the rotor 157 rotates in the opposite direction (e.g., opposite to arrow 140R) the overrunning clutch may open and reduce or entirely prevent rotation of the hub 155 (and thus the attached shaft 110-x) in this opposite or reverse direction. Thus, the overrunning clutch may transfer a rotational force from the rotor 157 to the corresponding shaft 110-x when it is locked and may not transfer a rotational force from the rotor 157 to the shaft 110-x when it is open. In some embodiments, it is envisioned that the overrunning clutch lockup direction may be reversed such that rotation of the shafts 110-x and the generator 109 may be reversed.

In some embodiments, a guide may be provided to align and guide the DC 122 during use. In addition, to prevent damage during storms, a lifting mechanism may be employed to lift one or more portions of the system away from the waterline, such as to lift one or more of the platform and/or one or more of the buoys. Other storm damage prevention methods and systems may include disengaging one more shafts 110-x such that they are not driven, and/or a braking system may be provided to retard or prevent motion of one or more portions of the system. Such damage prevention may be automatically performed by the controller upon detection of high waves that exceed a predetermined height threshold as detected by sensors such as accelerometers and/or motion sensors, and/or based on other sensor data such as wind speed that exceed a predetermined speed threshold, such as detected by wind sensors which may also include accelerometers and/or motion sensors, etc.

Figure 4:
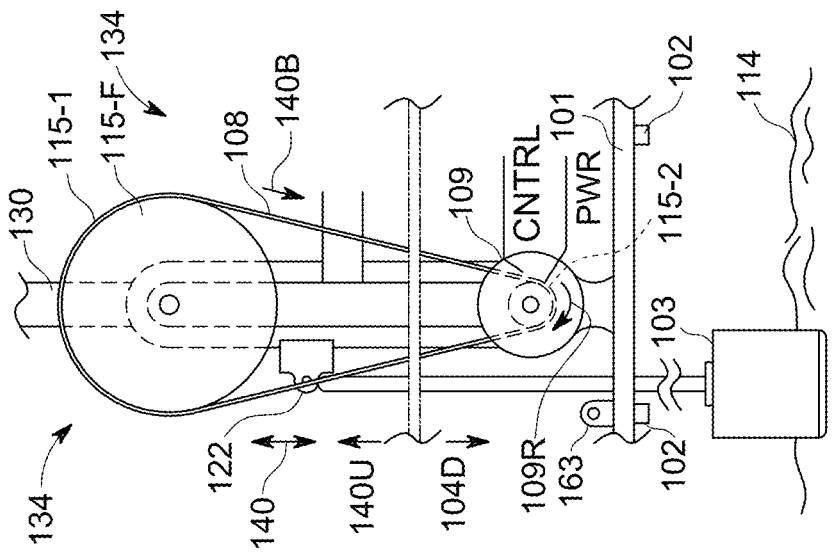
FIG. 4 shows a side view of a portion of the system of FIG. 1 in accordance with embodiments of the present system.

FIG. 4 shows a side view of a portion of the system 100 of FIG. 1 in accordance with embodiments of the present system. The transmission 134 is shown including the first and second pulleys 115-1 and 115-2, respectively, coupled together via a FTM such as a drive belt 108. The belt 108 may drive the generator 109 in a single direction 140B about its longitudinal axis (which corresponds with an axis of rotation of a rotor of the generator) as illustrated by arrow 109R.

In some embodiments FTMs may be twisted between pulleys or sprockets about which they loop such that the pulleys or sprockets may be driven in reverse directions to each other.

An exemplary coupling of the DC 122 and BUDS 104 will be described with reference to FIG. 5 through FIG. 7 below where: FIG. 5 shows a detailed side view of a portion of the system illustrating coupling of the DC 122 and BUDS 104 taken along line 5 of FIG. 3 in accordance with embodiments of the present system; FIG. 6 shows a top view of a portion of the system of FIG. 5 in accordance with embodiments of the present system; and FIG. 7 shows a front view of a portion of the system of FIG. 5 in accordance with embodiments of the present system.

With reference to FIG. 5 through FIG. 7, the DFTM 106 may include a chain 107 coupled to the DC 122 using any suitable coupler such as pins 152 (bolts, rods, clevis pins, etc.) which may pass through openings 150 of the DC 122 and through corresponding aligned openings in links 107E of the chain 107. The pins 152 may be held in position relative to the DC 122 using any suitable method(s) such as an interference fit, rings, clips, adhesives, screwable fittings, etc. In some embodiments, the DC 122 may be coupled to other portions of the chain 107 such as an area of the chain that is at or near an end link of the chain. When the DFTM 106 comprises a belt, the DC 122 may be coupled using any suitable method such as a friction fit, rivets, adhesives, etc.

The DC 122 may include flanges 158 configured to receive a coupling portion 159 of the BUDS 104. A pin 154 may pass through openings 156 of the flanges 158 and an opening of the coupling portion 159 so as to secure the BUDS 104 to the DC 122 using any suitable method such as a clevis pin, clips, an interference fit, rivets, etc. In some embodiments, fixed or flexible joints may be employed such as, for example, a rod end bearing (e.g., a heim joint, etc.). In some embodiments, it is envisioned that the BUDS 104 may be coupled to the DC 122 at a plurality of locations as may be desired. In some embodiments, the flanges 158 may include a single flange.

Description of Operation

Description of operation will now be described with reference to FIG. 1 through FIG. 4 wherein operation for a single buoy and associated portions such as its associated BUDS 104, DC 122, DFTM 106 (e.g., chain 107), and sprockets 105 will be discussed for the sake of clarity. During operation of the system, the waves 114 (which may include swells for the sake of clarity) may cause the buoy 103 to move up or down (e.g., oscillate at least in an upwards and downwards directions as illustrated by arrows 140U and 140D, respectively) which may cause the corresponding BUDS 104 and the DC 122 coupled thereto to move up or down in a reciprocal manner as illustrated by arrows 140U and 140D, respectively. Assuming the overrunning clutch is set to lock when the rotor 157 rotates in the rotational direction of arrow 140R and is set to open when the rotor 157 rotates in the rotational direction opposite to arrow 140R, the first and second shafts 110-x may be driven to rotate only in the rotational direction of arrow 140R (and not in the opposite rotational direction). The flywheel 115-F may maintain rotational momentum or motion. The generator 109 may be driven by the first shaft 110-1 via the transmission 134. In some embodiments, the generator 109 may be mounted to one of the first and second shafts 110-x directly or via a coupler (e.g., a rubber coupler or isolator or the like).

In some embodiments it is envisioned that the first and second shafts 110-x may be driven in the opposite direction of arrow 140R but in the same direction as each other by reversing a locking direction of the overrunning clutch or by reversing the mounting of the sprockets 105 upon the corresponding shaft 110-x.

Reversing the locking direction of the overrunning clutch may be desirable when a direction of the drive of the generator 109 is desirable or when the system 100 is transformed from a linear-drive to a cantilever drive and the drive direction of drive of the generator is not desired. In the linear-drive configuration, as the buoys rise due to the rising portion of the waves, which generates a stronger force compared to fall of the buoys due to the falling portion waves, the chain is also moved up to rotate the drive shaft, flywheel and generator in one direction, as the overrunning clutch is locked in the rising direction to drive the system and is disengaged/open in the falling direction. In cantilever drive embodiments, rising buoys rotate the drive shaft, flywheel and generator in a direction opposite the rotation for the linear-drive configuration. Accordingly, reversing the locking direction of the overrunning clutch may be performed to reverse chain loading, to reverse direction of rotation of the shafts 110-x, and/or to reverse generator rotation as may be desired.

In some embodiments of the present system the buoys and attached BUDSs travel in a substantially linear direction (e.g., up and down) as shown in FIGS. 1 through 8. These systems may be referred to as a linear drive system (LDS). However, it also envisioned that in some systems the buoys may be mounted to a lever which may pivot about a fulcrum or hinge coupled to the base. This system may be referred to as a lever drive system (LEDS). A LEDS will now be described with reference to FIG. 8 and FIG. 9 below. The LDS and LEDS may employ the same or a similar parts such as platforms, DPs, generator, transmissions, controllers, etc. However, the mounting of the BUDSs may differ. Accordingly, the same or similar numeric designations may be employed and depending upon embodiments, a system may be switched between the two systems and/or may employ both systems at the same time.

Lever Drive System (LEDS)

Figure 8:
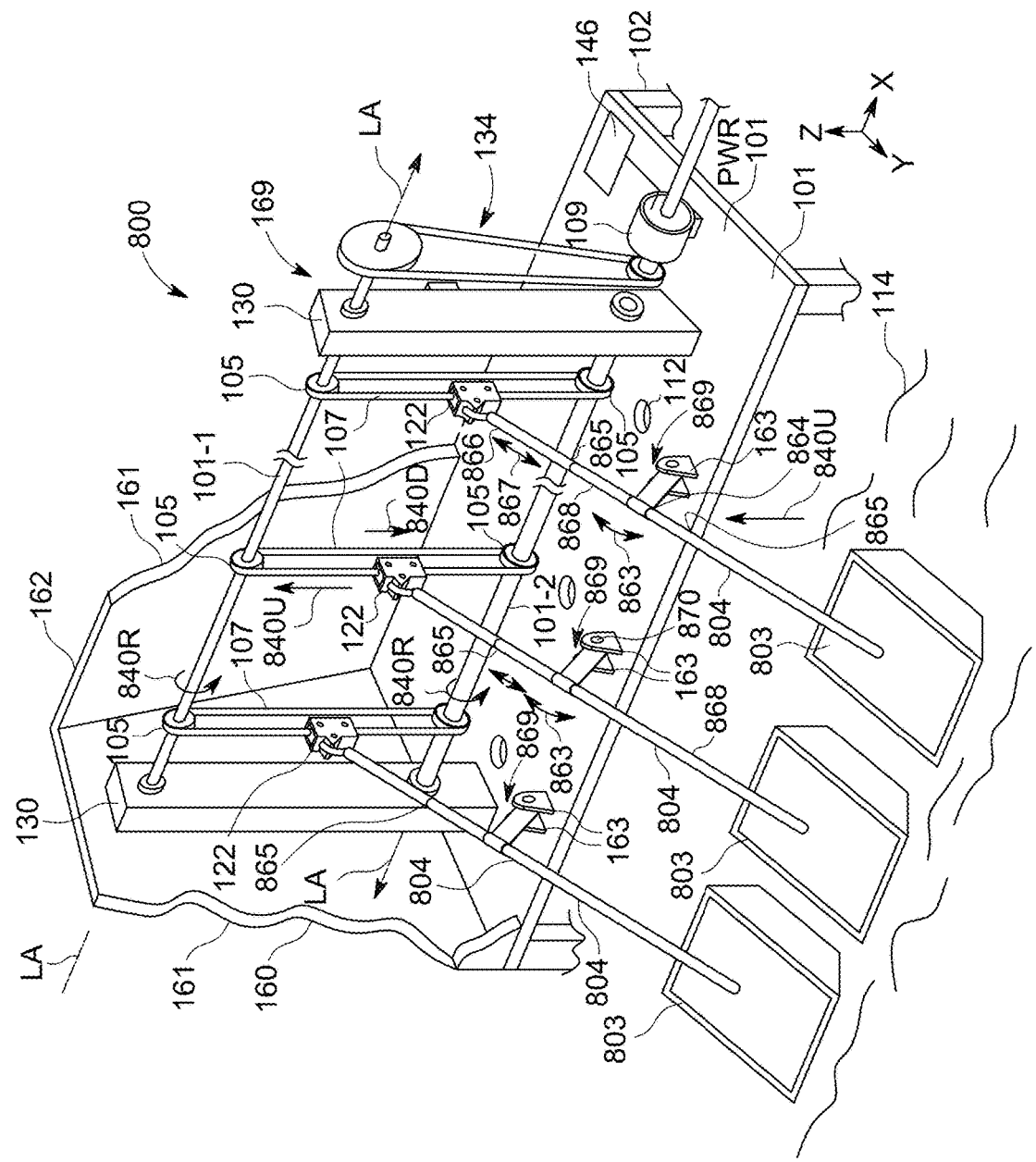
FIG. 8 shows a front side perspective view of a portion of a WPGS in accordance with embodiments of the present system.

FIG. 8 shows a front side perspective view of a portion of a wave-power generator system (hereinafter WPGS or system) 800 in accordance with embodiments of the present system; FIG. 9 shows a side view of a portion of a BUDS 804 coupled to the base 101 in accordance with embodiments of the present system; FIG. 10 shows a cross sectional view of a portion of a BUDS 804 taken along lines 10-10 of FIG. 9 in accordance with embodiments of the present system; and FIG. 11 shows a side view of a portion of the BUDS 804 in accordance with embodiments of the present system.

With reference to FIG. 8 through FIG. 11, the system 800 may generally be similar to the system 100. However, the system 800 may employ a coupler 869, such as a lever and fulcrum arrangement where the BUDS 804 may function as the lever with a buoy 803 coupled to the BUDS 804 at one side of a fulcrum or coupler 869 and the DC 122 coupled to the BUDS 804 on the other side of the fulcrum or coupler 869. Respectively, the BUDS 804 and the coupler 869 may form the lever and fulcrum arrangement. Accordingly, the BUDS/lever 804 may pivot about the fulcrum (or coupler 869), as illustrated by arrow 863, as the buoy 803 rises and falls with the waves 114 rising and falling, respectively. The BUDS 804 may include a primary portion 1 and a secondary portion 866 coupled via any suitable joint such as a slip joint (e.g., splined slip joints, etc.) 865 which may provide for the secondary portion 866 to linearly telescope (e.g., to linearly expand or contract as illustrated by arrow 867) relative to the primary portion 868 as the BUDS 804 pivots about the fulcrum as illustrated by arrow 863 during use. Thus, the length of the BUDS 804 may extend as an end of the secondary portion 866 slides away from the primary portion 868, or vice versa. The telescopic motion may allow the DC 122 and the attached portion of the chain 107 to travel in substantially linearly as the BUDS 804 pivots about the fulcrum. This may reduce pressure upon portions of the system such as the BUDS 804 and the chain 107 during use.

More particularly, the coupler 869 may include any suitable coupling such as a simple or complex hinge, a ball and socket joint, etc. For example, the coupler 869 may include a simple hinge comprising a flange 864 configured to be received within flanges 163 and with any suitable coupler such as a pin 870 (e.g., a clevis pin), a bolt, or the like, which may extend through the flanges 864 and 163 so as to couple them together. A bushing 871 (e.g., a polymer bushing, etc.) may provide for some play in the coupling if desired. In some embodiments, the coupler 869 may include a plurality of arms so as to form a complex hinge or the like. Chain tensioners are not shown for the sake of clarity. In yet other embodiments, the coupler 869 may include at least one "A," or "H" arm assembly secured to the BUDS 804 and the base 101. In some embodiments, a collar 875 may extend about a portion of the BUDS 804 and may fixedly or slidably secured to the BUDS 804.

During operation, as the buoy 803 and the corresponding side of the BUDS 804 travel upwards (e.g., as shown by arrow 840U) the BUDS 804 may pivot (or otherwise rotate) about the fulcrum (e.g., coupler 869) and force the opposite side of the BUDS 804 (e.g., the secondary portion 866) and the attached DC 122 (and attached portion of chain 107) downward (e.g., in the direction of arrow 840D) thus pulling the attached portion of chain 107 downward with it. The chain 107 may then transfer a force to the attached sprockets 105, which force may be operative to rotate the corresponding sprocket 105 in the direction of arrow 840R (e.g., in the reverse direction as the embodiments shown in FIGS. 1 through 4) thus, causing the overrunning clutches in the sprocket to lock and transfer force and motion from the sprocket to the shafts 110-x which, as a result, rotate in the direction of arrows 840R about their longitudinal axes (LA). The generator 109 may then be driven by the rotating shafts 110-x via the transmission 134. When the buoy 803 and the corresponding side of the BUDs 804 falls (e.g., in the direction of arrow 840D), the DC 122 and the attached portion of chain 107 may be driven upward in the direction of arrow 840U which may cause the sprockets 105 attached thereto to rotate in a direction opposite of that of arrow 840R thus causing the overrunning clutches to open and no substantial power is transferred to the shafts 110-x. Throughout this cycle, the overrunning clutches may be configured to cause the shafts 110-x to substantially rotate in a single direction only (e.g., in the direction of arrow 840R in the present embodiments).

Cantilever Drive System (CEDS)

Figure 12:
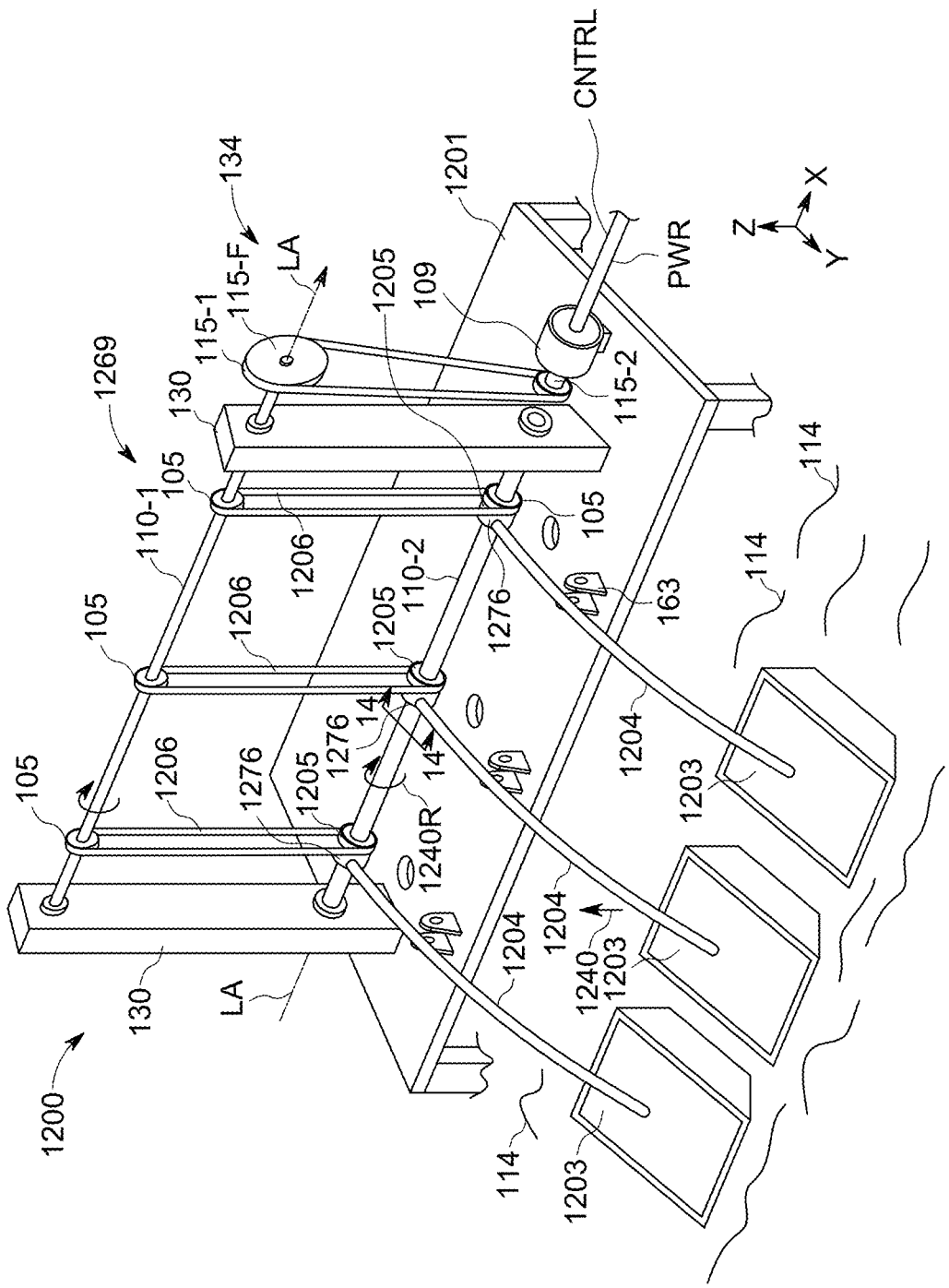
FIG. 12 shows a front side perspective view of a portion of a wave-power generator system in accordance with embodiments of the present system.
Figure 13:
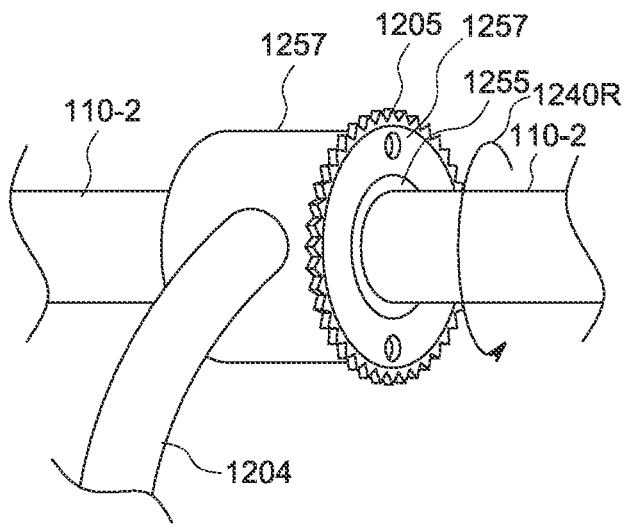
FIG. 13 shows a detailed front perspective view of a portion of a sprocket in accordance with embodiments of the present system.

FIG. 12 shows a front side perspective view of a portion of a wave-power generator system (hereinafter WPGS or system) 1200 in accordance with embodiments of the present system; FIG. 13 shows a detailed front perspective view of a portion of a sprocket 1205 in accordance with embodiments of the present system; and FIG. 14 shows a cross sectional view illustration of the sprocket 1205 taken along lines 14-14 of FIG. 12 in accordance with embodiments of the present system.

Figure 14:
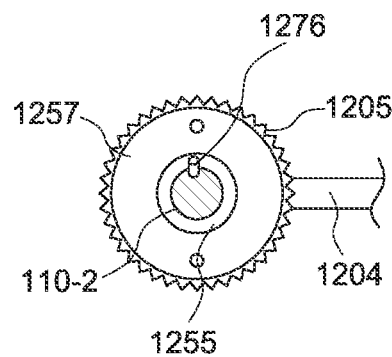
FIG. 14 shows a cross sectional view illustration of one sprocket taken along lines 14-14 of FIG. 12 in accordance with embodiments of the present system.
Figure 14A:
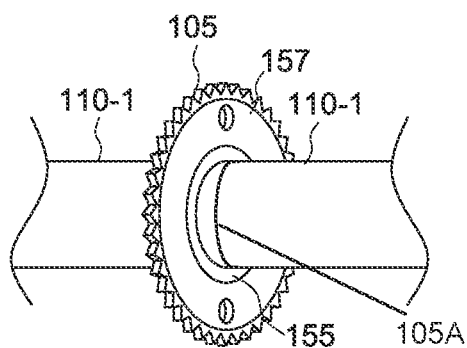
FIG. 14A shows a cross sectional view illustration of another sprocket in accordance with embodiments of the present system.

With reference to FIGS. 12 through 14, the system 1200 may generally be similar to the system 100 and may include sprockets 105 and 1205 coupled to first and second shafts 110-1 and 110-2. A chain 1206 may couple pairs of aligned sprockets 105 and 1205 together such that if one sprocket turns the other may turn. Although the sprockets are illustrated as the same size as each other in some embodiments, the sprockets 105 may be the same size or of a different size from the sprockets 1205, which is equally applicable to the other embodiments. The sprockets 1205 may be similar to the sprockets 105 and may include a rotor 1257 and a hub 1255. The rotor 1257 of the sprockets 1205 may be coupled to the hub 1255 via an overrunning clutch (e.g., a freewheel, a sprag clutch, etc.) such that the rotor 1257 may only drive the hub 1255 and the shaft 110-2 coupled thereto in a first direction (e.g., in direction as indicated by arrow 1240R) and may overrun in the other direction (e.g., in the direction opposite to arrow 1240R). As in the other embodiments and similar to the sprockets 1205, the sprockets 105 may also include an overrunning clutch. The hub 1255 and shafts 110-x may include keyways configured to receive a key 1276 which may rotationally lock the hub 1255 to the shaft 110-x so as to prevent rotation of the hub 1255 relative to the shaft 110-x upon which it is mounted. In some embodiments, the hub may be rotationally locked to the shaft upon which it is mounted using a spline or threaded fitting. In some embodiments, the overrunning clutch may be passive or active. The rotor 1257 may be configured to be coupled to BUDS 1204 such that the BUDS 1204 extends outward from the rotor 1257 and may be coupled at its distal end to a corresponding buoy 1203. That portion of the system 1200 that includes at least the first or second shafts 110-1 and 110-2, respectively, the sprockets 105 and 1205, and the DFTM 106 may be referred to as a drive portion (DP) 1269. The base 1201 may be similar to the base 101 of FIG. 1. The shafts 110-x may be supported by one or more bearings.

During operation, as the buoy 1203 travels upward (e.g., as illustrated by arrow 1240) it may cause the attached BUDS 1204 to rotate the sprocket 1205 it is attached to about the sprockets longitudinal axis (LA) in the direction of arrow 1240R. The paired (e.g., aligned) sprocket 105 may then be driven by the chain 1206 in the same direction. The generator 109 may be driven by the rotating shaft 110-x via the transmission 134.

Hybrid Drive Systems (HDS)

Figure 15:
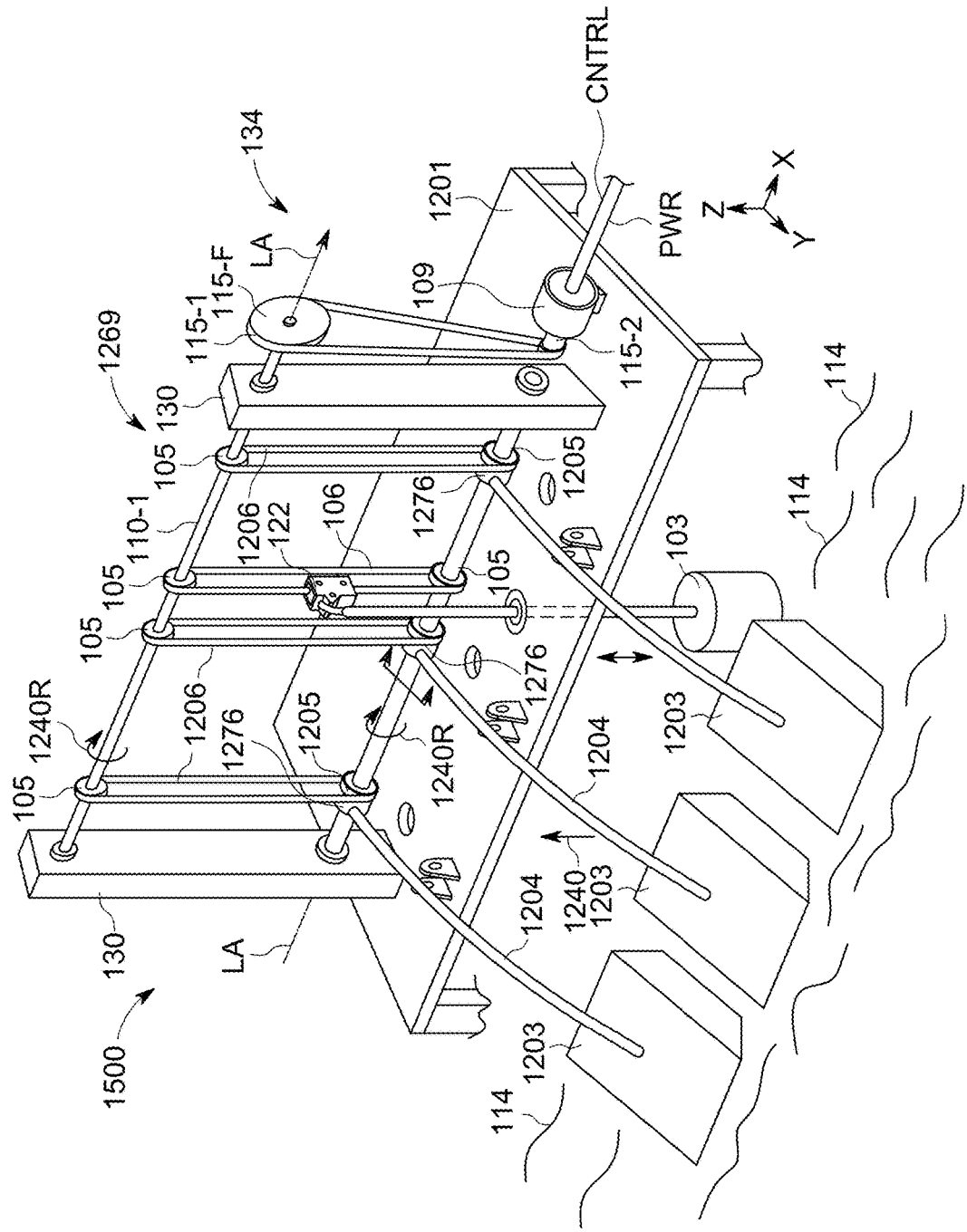
FIG. 15 shows a front side perspective view of a portion of a wave-power generator system employing Linear Drive System (LDS) and Cantilever Drive System (CEDS) in accordance with embodiments of the present system.

In some embodiments, combinations of the various embodiments such as the LDS, LEDS, CEDS, etc. described herein may be combined with each other. This is illustrated with reference to FIG. 15 which shows a front side perspective view of a portion of a wave-power generator system 1500 employing LDS and CEDS in accordance with embodiments of the present system. The system may be configured and arranged to be operative using LDS and/or CEDS.

In some embodiments it is envisioned that hydraulics may be employed to transfer forces from buoys to the drive sprockets of the systems. Such systems will now be described with reference to FIGS. 16A through 19.

Hybrid Drive System with Vertical Drive Portion (DP)

Figure 16A:
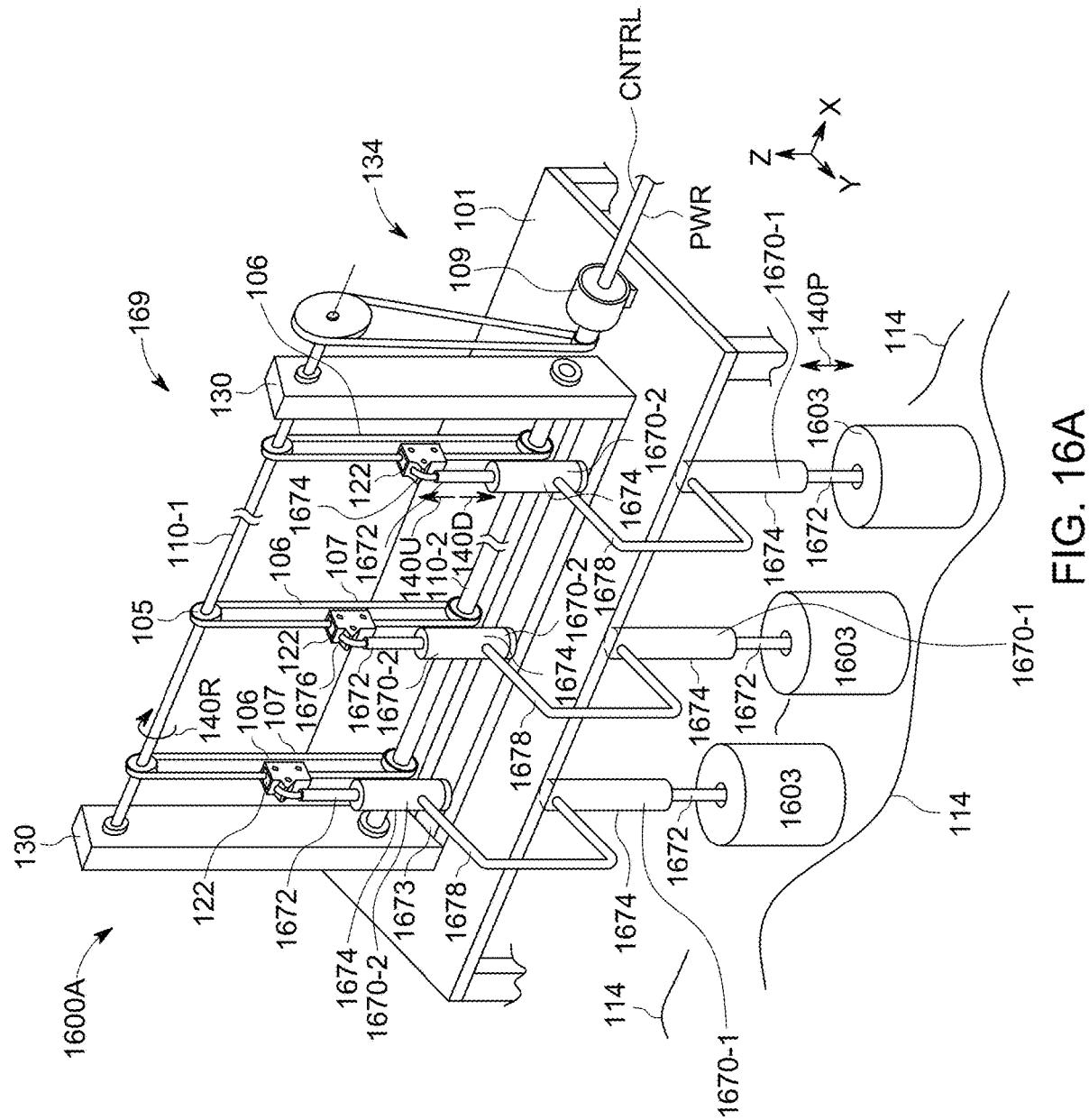
FIG. 16A shows a front side perspective view of a portion of a hydraulic wave-power generator system in accordance with embodiments of the present system.

FIG. 16A shows a front side perspective view of a portion of a hydraulic wave-power generator system (hereinafter HWPGS or system) 1600A in accordance with embodiments of the present system. The system 1600A may generally be similar to the system 100. However, the system 1600A may transfer energy from the buoys 103 to the DC 122 using first and second coupled hydraulic cylinders 1670-1 and 1670-2 (generally 1670-x), respectively, which may act as primary and secondary hydraulic cylinders, respectively. For the sake of clarity, it will be assumed that the primary hydraulic cylinders will drive the secondary hydraulic cylinders. The primary and secondary hydraulic cylinders may be referred to as the first and second hydraulic cylinders, respectively.

Each of the primary and secondary hydraulic cylinders 1670-1 and 1670-2, respectively may have cylinder barrels 1674 from which piston rods 1672 may telescopically extend or retract. The piston rods 1672 may include proximal and distal ends, with a piston situated at the proximal end and situated within the corresponding cylinder barrel 1674.

With regard to the primary hydraulic cylinders 1672-1, ends of their piston rods 1672 may include an end coupler such as a threaded coupler configured to be coupled to a threaded coupler of a corresponding buoy 1603. However, other suitable types of couplers are also envisioned as may be desired. The cylinder barrels 1674 of the primary hydraulic cylinders 1672-1 may be coupled to the base 101 using any suitable method such as welds, brackets, threaded fittings, interference fits, pins (e.g., clevis pins), etc. so as to substantially maintain an orientation (e.g., a vertical orientation in the present embodiments) of the first hydraulic cylinders 1672-1 such that the buoys 1603 may remain in the water and rise and fall with the waves 114.

With regard to the secondary hydraulic cylinders 1672-2, ends of their piston rods 1672 may include a coupler such as a rod end coupler configured to be coupled to a clevis end 1676 of the DC 122. However, other suitable types of couplers are also envisioned as may be desired. The cylinder barrels 1674 of the secondary hydraulic cylinders 1672-2 may be coupled to the base 101 directly or to a support (e.g., a clevis support, etc.) or to a cross-brace 1673 (as shown), or using any suitable support such as clevis joints, welds, brackets, threaded fittings, interference fits, pins, etc.

The primary and secondary hydraulic cylinders 1670-1 and 1670-2, respectively, may be directly coupled (e.g., hydraulically coupled) to each other (e.g., to form paired hydraulic cylinders) using one or more hydraulic conduits 1678 configured such that when the piston rod 1672 of the primary hydraulic cylinder 1670-1 retracts into its corresponding cylinder barrel 1674, hydraulic fluid may be displaced and may act upon the piston of the paired secondary hydraulic cylinder 1670-2 to extend the piston rod 1672 of the second hydraulic cylinder 1670-2 from its corresponding cylinder barrel 1674 and vice versa.

Embodiments of the present system may employ buoys coupled directly to one or more generators, where the buoys pressurize the hydraulic lines and cylinder(s) for driving at least one generator. This may obviate the need for one or more pumps configured to pressurize hydraulic cylinder(s). Avoiding the use of pumps and providing a substantially direct hydraulic coupling from the buoys to a generator without a pump therebetween increases efficiency of the system, as energy loss due to the pump is avoided. In addition, the system is simplified and manufacturing and operating costs reduced. Such direct hydraulic coupling is provided via the primary and secondary hydraulic cylinders 1670-1, 1670-2, and the hydraulic conduits 1678. Further, the drive coupler (DC) 122, the chain 107 or belt 108 of the drive force transmitting member (DFTM) 106, and the transmission 134 may provide direct mechanical coupling from the hydraulic system (i.e., from the hydraulic cylinders 1670-1, 1670-2 and conduits 1678) to the generator 109. Further, this direct coupling may obviate the need for additional hydraulic lines, couplings, valves, controllers, actuators, and/or accumulators. Such features including such direct couplings simplify design and construction of the system, contribute to cost savings, and enhance energy efficiency. In alternate embodiments, a pressure control system may be provided to control pressure in one or more hydraulic lines. For example, the pressure control system may include at least one accumulator coupled to the one or more hydraulic lines, such as between the primary and secondary hydraulic cylinders, in order to absorb and store excess pressure in the one or more hydraulic lines. The pressure control system may be a passive system such as including passive pressure valves operationally coupled to the at least one accumulator, where the passive pressure valves are activated once the pressure in the hydraulic lines and/or cylinders reaches a predetermined threshold. Alternatively or in addition, an active pressure control system may be provided including pressure sensors that are configured to provide pressure signals to a controller that controls pressure valves operationally coupled to the at least one accumulator in response to the pressure signals being above a predetermined threshold level.

Referring back to the figures such as FIG. 16A, when one of the buoys 1603 moves upward, the piston rod 1672 and piston of the primary hydraulic cylinder 1670-1 that is coupled to the buoy 1603 retracts into its corresponding cylinder barrel 1674 and displaces hydraulic fluid which fluid is then transferred via corresponding hydraulic conduits 1678 to the coupled secondary hydraulic cylinder 1670-2 thus forcing the piston rod 1672 of the secondary hydraulic cylinder 1670-2 to extend from its corresponding barrel 1674. Conversely, when one of the buoys 1603 moves downward (e.g., in the direction of arrow 140D), the piston rod 1672 and piston of the primary hydraulic cylinder 1670-1 that is coupled to the buoy 1603 is pulled from (e.g., extends) its corresponding cylinder barrel 1674 and draws hydraulic fluid from the coupled secondary hydraulic cylinder barrel 1670-2 thus forcing the piston rod 1672 of the secondary hydraulic cylinder 1670-2 to retract from the its corresponding barrel 1674. Thus, reciprocal motion of the buoy 1603 (e.g., due to waves and/or swells, etc.) will cause alternating reciprocal motion of the piston rods 1672 of the coupled (e.g., paired) primary and secondary hydraulic cylinders 1670-1 and 1670-2, respectively. As piston rod 1672 of the secondary hydraulic cylinder 1670-2 is coupled to the DC 122, this reciprocal motion may be transferred to the DC 122 which may then reciprocate accordingly. This reciprocation may rotate the coupled sprockets 105 to transfer a force to the corresponding shafts 110-x via corresponding overrunning clutches to rotate the first and second shafts 110-x in a single direction as illustrated by arrow 140R as described elsewhere throughout in this application. The generator 109 may then be driven (e.g., its input shaft rotated) by one of the first and second shafts 110-x such as the first shaft 110-1 via the transmission 134 as described elsewhere in this application.

In some embodiments, it is envisioned that the bores of the paired primary and secondary hydraulic cylinders 1670-x may be equal to, or different from, each other as may be desired. This may vary the force and/or travel of piston rods of the paired primary and secondary hydraulic cylinders 1670-x relative to each other.

Figure 16B:
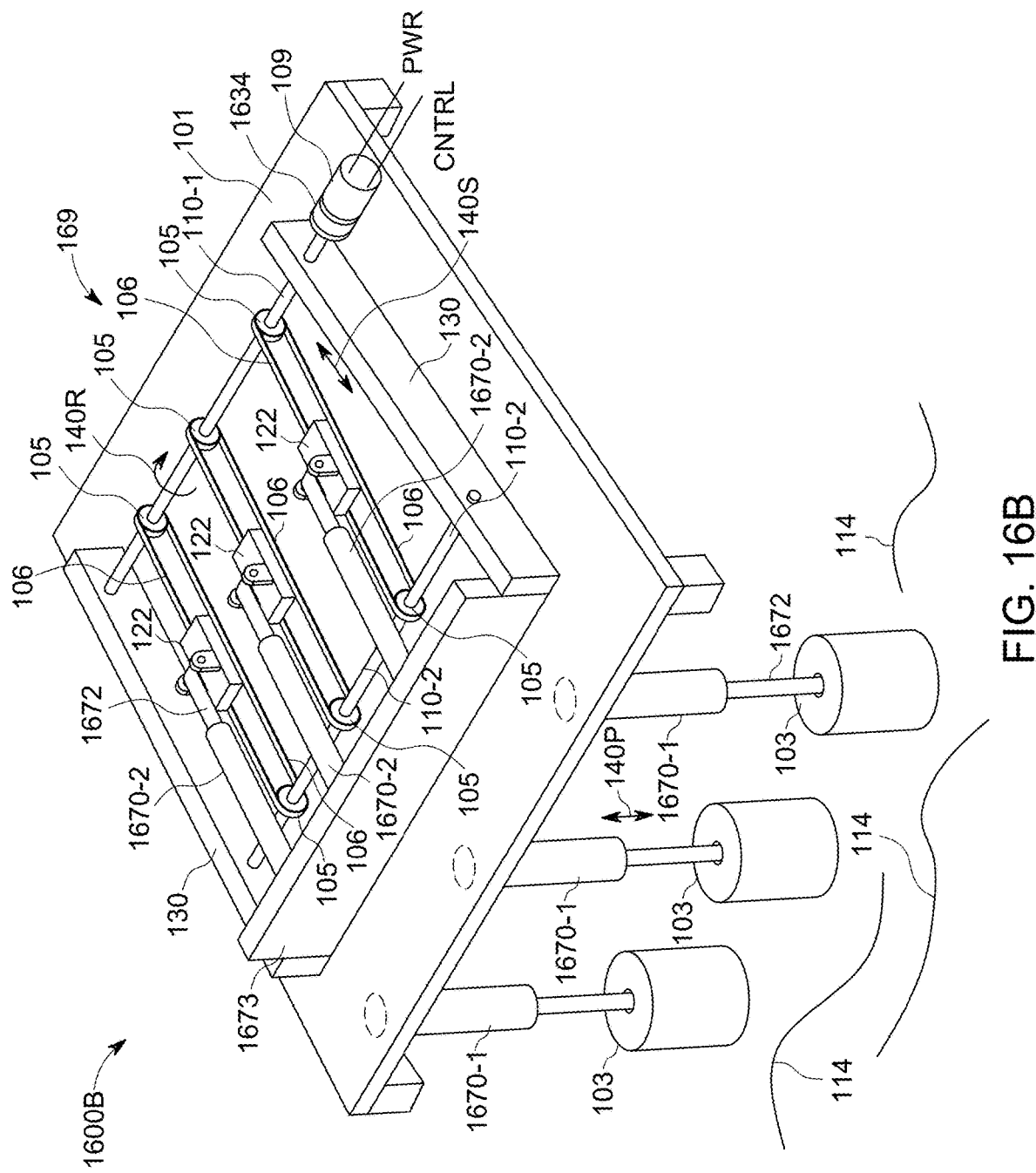
FIG. 16B which shows a front side perspective view of a portion of a Hydraulic Wave-Power Generator System (HWPGS) with a horizontally oriented drive portion (DP) in accordance with embodiments of the present system.

That portion of the system 1600A that includes at least the first or second shafts 110-1 and 110-2, respectively, the sprockets 105, and the DFTM 106 may be referred to as a drive portion (DP) 169 and is oriented in a vertical position. However, in some embodiments, the DP 169 may be oriented in a horizontal position as illustrated in FIG. 16B which shows a front side perspective view of a portion of a HWPGS 1600B with a horizontally oriented DP 169 in accordance with embodiments of the present system. The system 1600B may generally be similar to the system 1600A with the DP 169 in a horizontal position and the drive generator 109 coupled to the second shaft 110-2 via an inline transmission 1634 rather than a belt. During operation, the buoys 103 may drive the piston rods 1672 of the primary hydraulic cylinders 1670-1 to oscillate vertically in the direction of arrow 140P. The primary hydraulic cylinders 1670-1 may then drive the piston rods 1672 of the secondary hydraulic cylinders 1670-2 to oscillate horizontally in the direction as illustrated by arrow 140S. As the DC 122 is coupled to the piston rods 1672 of the secondary hydraulic cylinders 1670-2, the DC 122 may also oscillate in the direction of arrow 140S (e.g., in a horizontal plane rather than in a vertical plane as described elsewhere) thus driving the sprockets 105 via the DFTM 106 such as chain 107. The sprockets 105 may then drive the shafts 110-x via overrunning clutches so that the shafts 110-x rotate in the direction indicated by arrow 140R. The generator 109 may then be driven by one of the shafts 110-x such as the first shaft 110-1 via the transmission 1634.

Figure 16C:
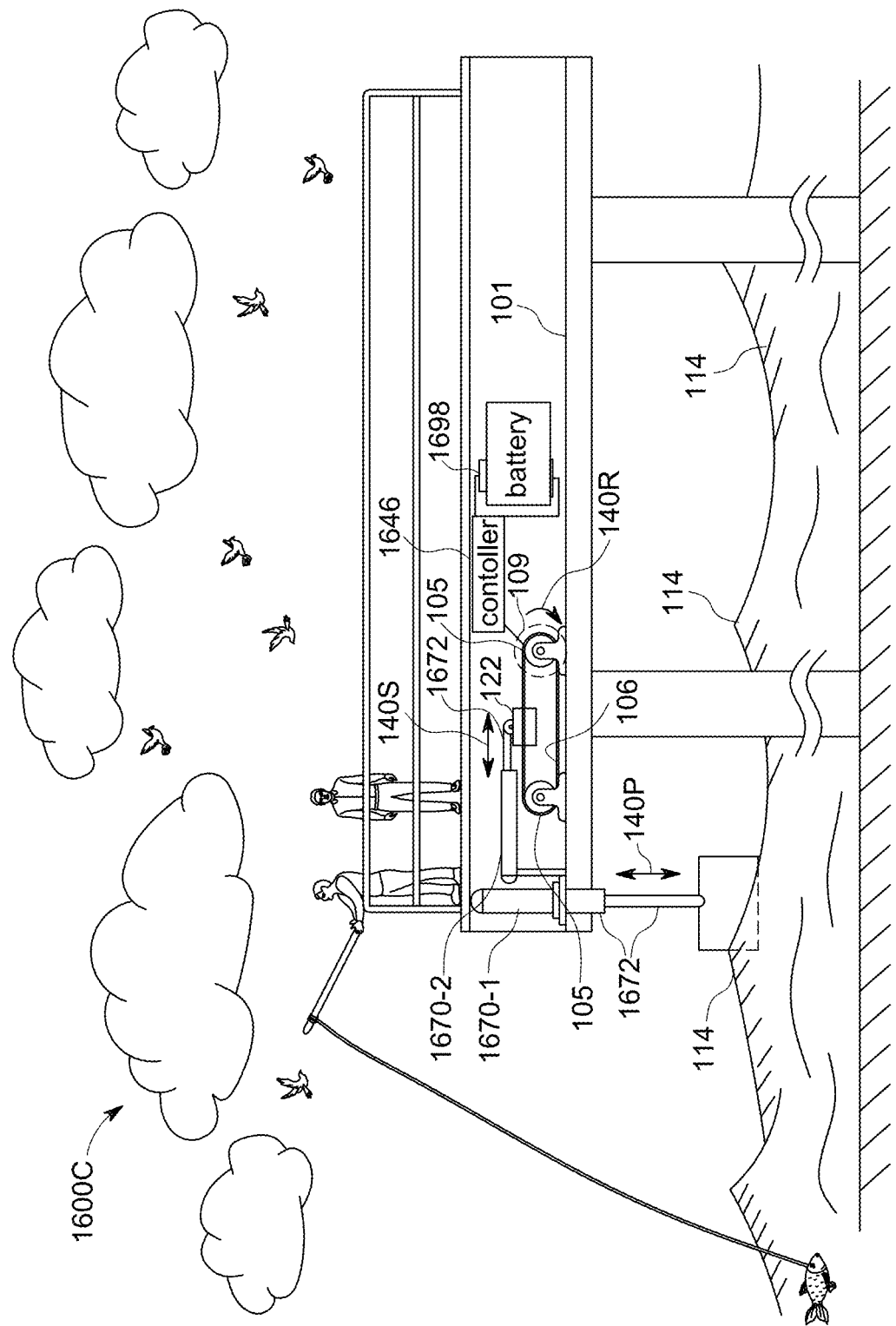
FIG. 16C shows a side planer view of a portion of a HWPGS with a horizontally oriented DP in accordance with embodiments of the present system.

Horizontal orientation of the DP 169 may reduce space required for the system. This may be beneficial when placing systems in for example, a pier, an ocean oil rig, etc. For example, FIG. 16C shows a side planer view of a portion of a HWPGS 1600C with a horizontally oriented DP 169 in accordance with embodiments of the present system. The system 1600C may be similar to the system 1600B of FIG. 16B with primary hydraulic cylinders 1670-1 situated at least partially through openings in the base 101, this may reduce height of the system 1600C. Power generated by the system may be used by the system, stored in a battery 1698 for later use, and/or may be provided to mains power under the control of a controller 1646 of the system, which may be equally applicable in the various embodiments. The controller 1646 of the system may include a battery management system which may manage charge, discharge, heating, and cooling of the battery 1698. Further, a battery heating and/or cooling system may be provided to condition the battery 1698 to enhance reliability, storage, and/or draw. The system may operate similarly to the system 1600B of FIG. 16B.

Hybrid Drive System with Arm

Figure 17:
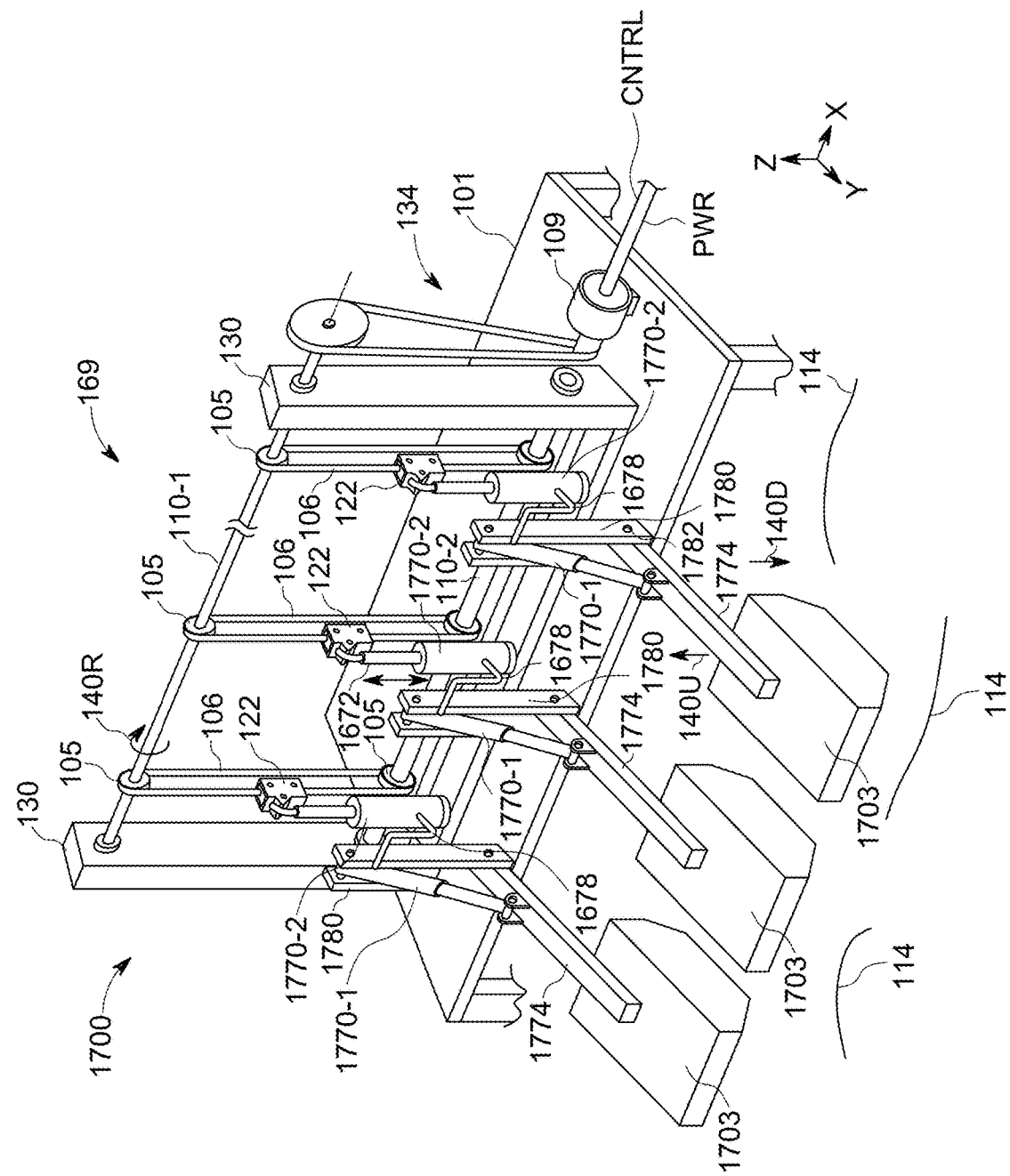
FIG. 17 shows a front side perspective view of a portion of a hydraulic wave-power generator system with a vertically oriented DP) in accordance with embodiments of the present system.
Figure 18:
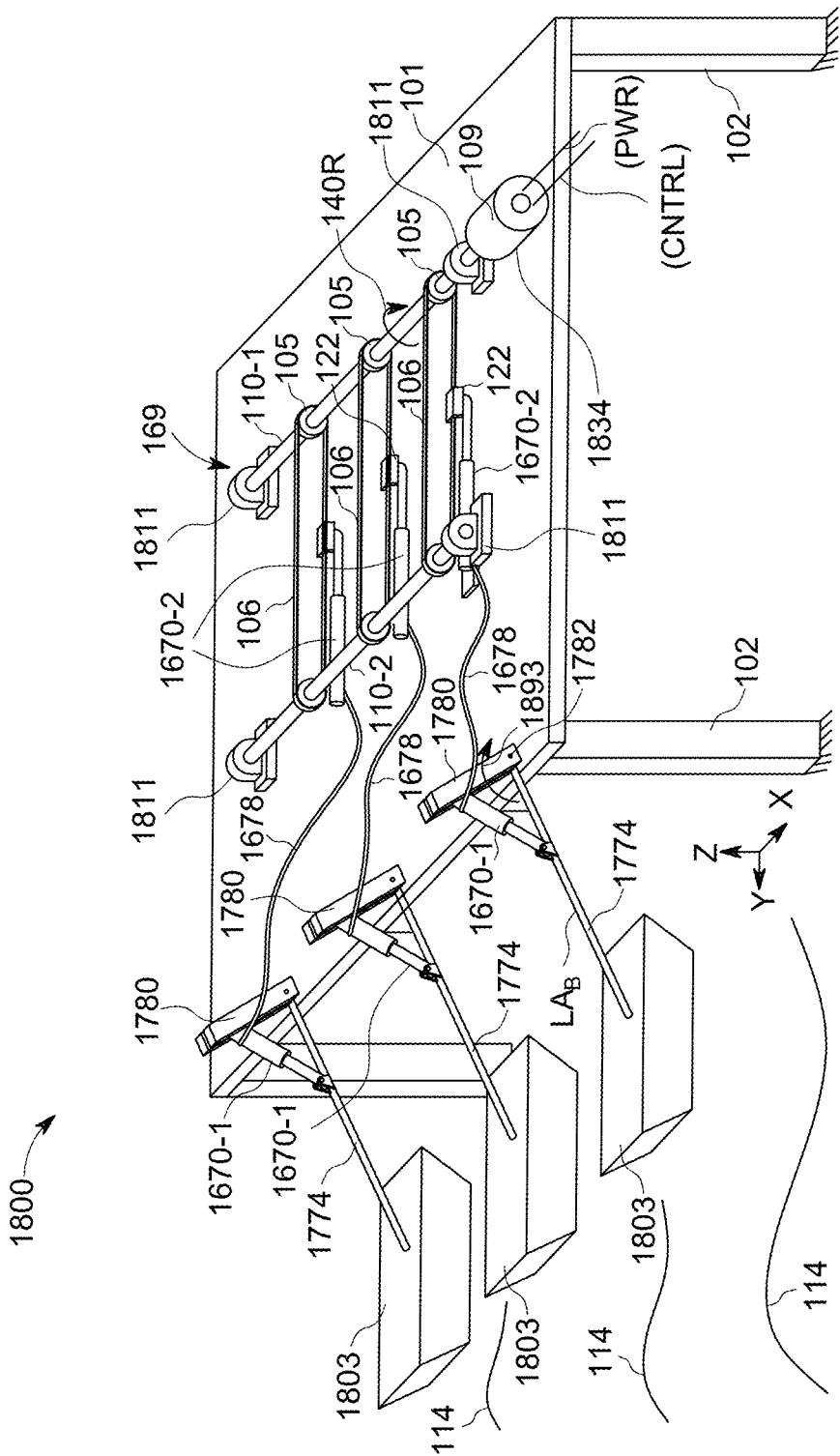
FIG. 18 shows a front side perspective view of a portion of a hydraulic wave-power generator system with a horizontally oriented DP in accordance with embodiments of the present system.
Figure 19:
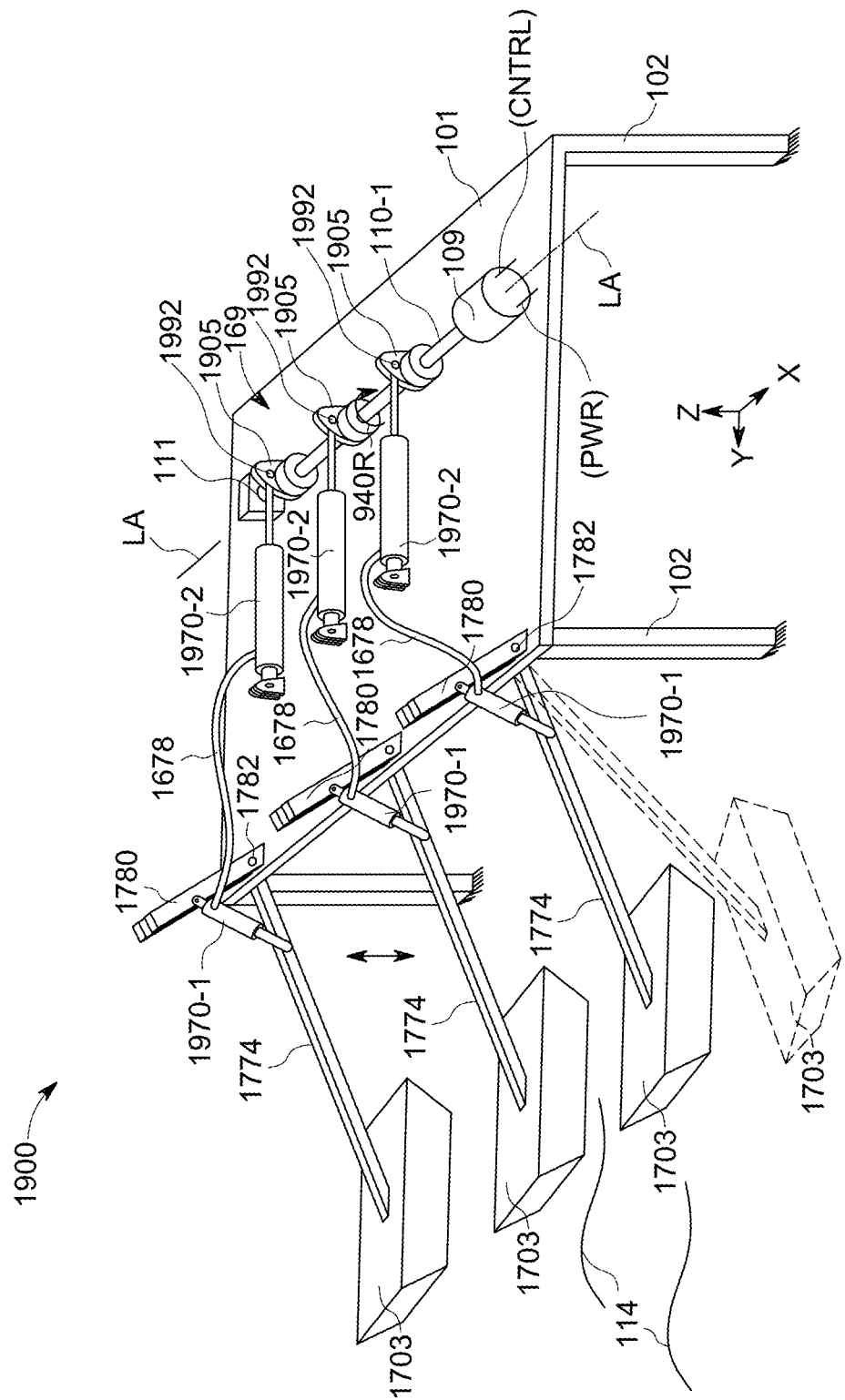
FIG. 19 shows a front side perspective view of a portion of a hydraulic wave-power generator system with a horizontally oriented DP in accordance with embodiments of the present system.

In some embodiments, rather than the primary hydraulic cylinders supporting a buoy directly, at least one arm may be provided and configured to support a corresponding buoy. Suitable arrangements may include a single arm or a plurality of arms forming a parallelogram or other shape. In some embodiments, at least one arm may include a lever or cantilevered arm configured to support a buoy. One or more primary hydraulic cylinders may then be coupled between the at least one arm and a stationary support such that as the buoy rises it raises (e.g., in response to a wave hitting it, etc.) the arm raises which compresses the corresponding hydraulic cylinder. In response, the secondary hydraulic cylinder may extend and impart motion to the chain coupled thereto via the DC. FIGS. 17 through 19 illustrate Hybrid Drive Systems (HDS) in which the buoys are supported by one or more buoy support arms (BSAs) 1774 which may pivot about one or more portions of the system such as supports. For example, FIG. 17 shows a front side perspective view of a portion of a hydraulic wave-power generator system (hereinafter HWPGS or system) 1700 with a vertically oriented DP 169 in accordance with embodiments of the present system; FIG. 18 shows a front side perspective view of a portion of a hydraulic wave-power generator system (hereinafter HWPGS or system) 1800 with a horizontally oriented DP 169 in accordance with embodiments of the present system; and FIG. 19 shows a front side perspective view of a portion of an HWPGS 1900 with a horizontally oriented DP 169 in accordance with embodiments of the present system.

With reference to FIG. 17, the system may be similar to the system 1600A and includes primary hydraulic cylinders 1770-1 that are coupled to, and drive, secondary hydraulic cylinders 1670-2 that may be coupled to the DC 122. The DC 122 may be coupled to a chain 106 that may drive shafts 110-x via sprockets 105. The generator 109 may be driven by one of the drive shafts 110-x via transmission 134.

One or more buoys 1703 may be supported by BSAs 1774 that may be pivotally coupled to the base 101 via supports 1780 so that the one or more buoys 1703 may move up and down as they float upon waves 114. In some embodiments, the supports 1780 may be raised or lowered vertically (e.g., using a screw drive, hydraulic cylinders, etc.) so that the buoys 1703 may be raised or lowered to account for tides that may raise or lower the water level. The BSAs 1774 may be coupled to the supports 1780 using any suitable method such as clevis pins inserted through openings in the BSAs 1774 and the supports 1780 that are aligned; although other suitable couplings are also envisioned. Each of the primary hydraulic cylinders 1770-1 may be coupled to a corresponding one of the BSAs 1774 and a stationary (or adjustable) attachment such as a corresponding support 1780 of the supports 1780. Accordingly, when a corresponding buoy 1703 rises with a wave 114 (e.g., in the direction of arrow 140U) it may compress the corresponding primary hydraulic cylinder 1770-1 and hydraulic fluid may be transferred to a coupled secondary hydraulic cylinder 1770-2 (via conduit 1678 such as a hydraulic hose, etc.). The secondary hydraulic cylinder 1770-2 may then drive the FTM 106 (e.g., chain or belt) via the DC 122 in a similar manner as described elsewhere in this application such that the shafts 110-x may turn in the direction of arrow 140R. A portion of the secondary hydraulic cylinder 1770-2 may be supported by or constrained by the FTM 106. The generator 109 may be coupled to one of the shafts 110-x via the transmission 134. When the corresponding buoy 1703 lowers (e.g., in the direction of arrow 140D), it may decompress the corresponding primary hydraulic cylinder 1770-1 and the hydraulic cylinder 1770-1 may telescopically expand as gravitational force applied to one or more portions of the system such as the buoy 1703 and the BSA 1774 may exert tension across the hydraulic cylinder 1770-1. In some embodiments, the generator 109 may be controlled by the controller to function as a motor.

In some embodiments, it is envisioned that the BSAs may include arms of other shapes such as "A," "H," "U," etc. for stability. In some embodiments, it is envisioned that the buoys may be supported by a multi-arm arrangement or by parallel arms (e.g., parallel "A" arms, etc.). The buoys 1703 may be positioned at an angle to the water and/or may pivot about the coupler (e.g., the coupler pin 1782) as they rise and/or fall with the waves 114. Accordingly, the buoys may drop away from the platform vertically such that they may rise and fall (vertically) with the waves as they pivot about their coupling to the platform.

With reference to the embodiments shown in FIG. 18, the system 1800 may include a horizontally oriented DP 169 in the same plane as a base 101 in accordance with embodiments of the present system. The generator 109 may be driven via the first shaft 110-1 via a transmission 1834 such as a direct coupling, a planetary gearset, etc. Shaft supports 1780 may be integrated into the base 101 and may be situated in the same plane. Bearings 1811 may support the shafts 110-x and may be coupled to the base 101. Primary hydraulic cylinders 1670-1 may be coupled to secondary hydraulic cylinders 1670-2, the latter of which may include pistons coupled to respective DCs 122 that may drive an FTM 106 such as a chain. During operation, shafts 110-x may rotate in the direction of arrow 140R. Operation of this embodiment may be similar to other embodiments described herein. The buoys 1803 may define a plane (e.g., x'-y') that may be positioned at an angle alpha ($\alpha$) with a horizontal plane (x-y axes as shown) when at the water line in calm water at a mean water line such that sufficient articulation may be provided for a range of wave heights and tide levels. The buoys 1803 may pivot about one or more pivot points 1782 such that sufficient motion of the buoys 1803 may be established for a desired location. This may reduce stress on system components. Further, a longitudinal axis LAB of the BSAs 1774 may define an angle beta ($\beta$) with respect to the x-y plane. The angle beta ($\beta$) may vary as buoys 1703 rise and fall and cause the BSAs 1774 to rotate or otherwise articulate about their corresponding pivot point(s), as shown by curved arrow 1893, such as may be defined by their joints such as coupler pins 1782 in the present embodiments. In some embodiments, flexible couplers made from a rubber or a polymer may be employed.

With regard to the embodiments shown in FIG. 19, the primary hydraulic cylinders 1970-1 may be coupled to the BSA 1774 and secondary hydraulic cylinders 1970-2 in a similar manner as that shown in FIG. 18. However, the secondary hydraulic cylinders 1970-2 may be coupled to sprockets or freewheels 1905 of the first shaft 110-1 using corresponding offset pins 1992 (e.g., a crank pins). Accordingly, when cycled through an extension-retraction cycle (e.g., where the piston extends and retracts from the barrel of the cylinder 1970-2 as in other embodiments of the present system), the secondary hydraulic cylinders 1770-2 may partially rotate the crankpin 1992 about a longitudinal axis (LA) of the first shaft 110-1. During this cycle, when the crankpin rotates the corresponding freewheel 1905 in the direction of arrow 940R, an overrunning clutch of the corresponding freewheel 1905 may lock and the crankpin may rotate the first shaft 110-1 in the direction of arrow 940R about the longitudinal axes (LA). The generator 109 may then be driven by the first shaft 110-1 coupled thereto. However, when the crankpin rotates the corresponding freewheel 1905 in the direction opposite of arrow 940R, an overrunning clutch of the corresponding freewheel 1905 may open and the crankpin may not rotate the first shaft 110-1. The generator 109 may then be driven by the first shaft 110-1 coupled thereto. The generator 109 may be assumed to include a flywheel as described elsewhere in this application. For the sake of clarity, it will be assumed that when the buoys 1703 rise, the first hydraulic cylinders compresses and transfers hydraulic fluid to the second hydraulic cylinders which then expands and vice versa.

Figure 20:
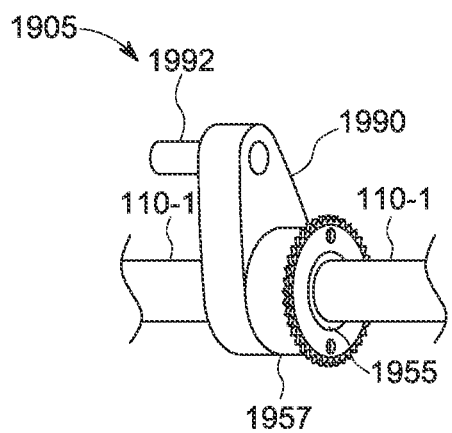
FIG. 20 shows a detailed perspective view of a portion of a sprocket in accordance with embodiments of the present system.

FIG. 20 shows a detailed front perspective view of a portion of a sprocket 1905 in accordance with embodiments of the present system. The sprocket 1905 may include a rotor 1957 coupled to a hub 1955 via an overrunning clutch (e.g., a freewheel, a sprag clutch, etc.) such that the rotor 1957 may only drive the hub 1955 in a first direction (e.g., in direction 140R) and may overrun in the other direction. A crankpin 1992 may be coupled to the rotor 1957 via a web 1990.

With regard to hydraulic cylinders employed herein, it would be appreciated that they may be configured to act as a hydraulic rams including pistons and barrels that may be reversed on one or more hydraulic cylinders primary and secondary pair (e.g., paired hydraulic cylinders).

Figure 21:
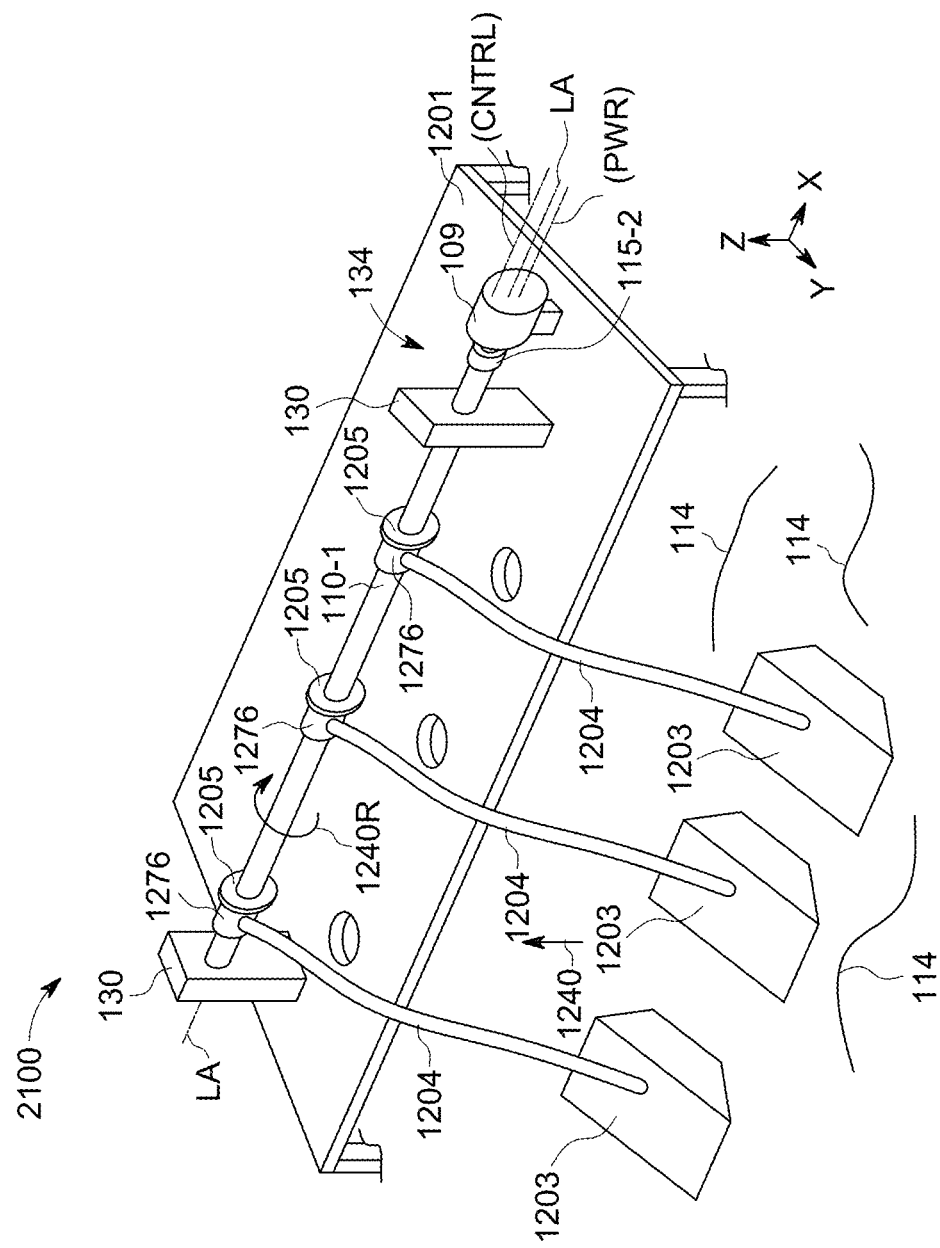
FIG. 21 shows a front side perspective view of a portion of a WPGS in accordance with embodiments of the present system.
Figure 22:
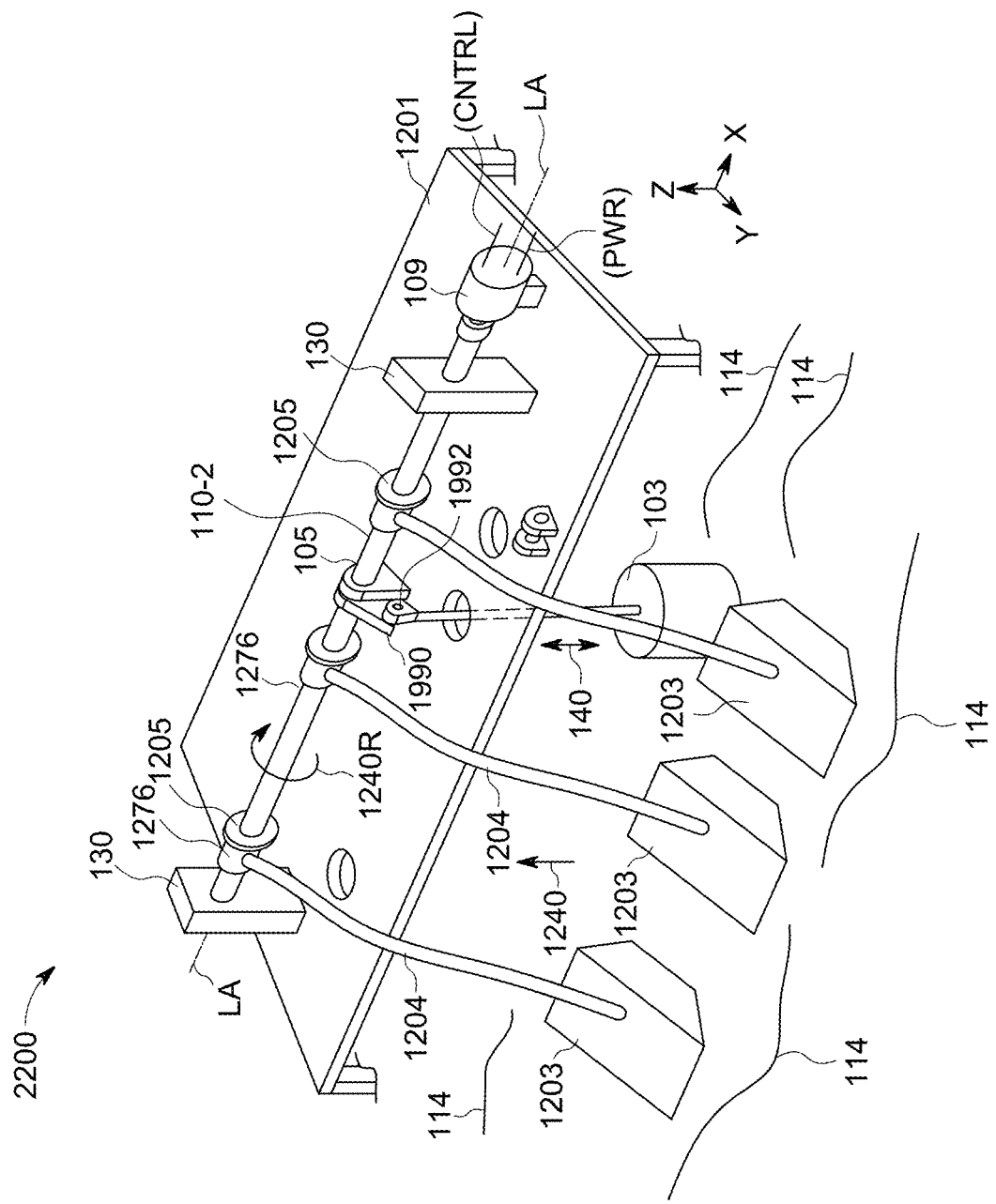
FIG. 22 shows a front side perspective view of a portion of a WPGS in accordance with embodiments of the present system.

Various other drive system combinations may be employed according to embodiments of the present system. For example, FIG. 21 shows a front side perspective view of a portion of a WPGS 2100 in accordance with embodiments of the present system; FIG. 22 shows a front side perspective view of a portion of a WPGS 2200 in accordance with embodiments of the present system. With reference to FIG. 21, a CEDS employing a single shaft such as the shaft 110-1 may be driven by BUDS 1204 (instead of the dual shafts 110-1, 110-2 of the embodiment shown in FIG. 12). This shaft may then drive the motor 109 via transmission 134.

An HDS of this embodiment of FIG. 21 is shown in FIG. 22 including CEDS and LDS functionality. The HDS shown in FIG. 22 is similar to that shown in FIG. 15 but has a single shaft 110-2, instead of the two shafts 110-1, 110-2 of the HDS shown in FIG. 15.

Embodiments with crankpins will now be discussed with reference to FIGS. 23 through 24.

Figure 23:
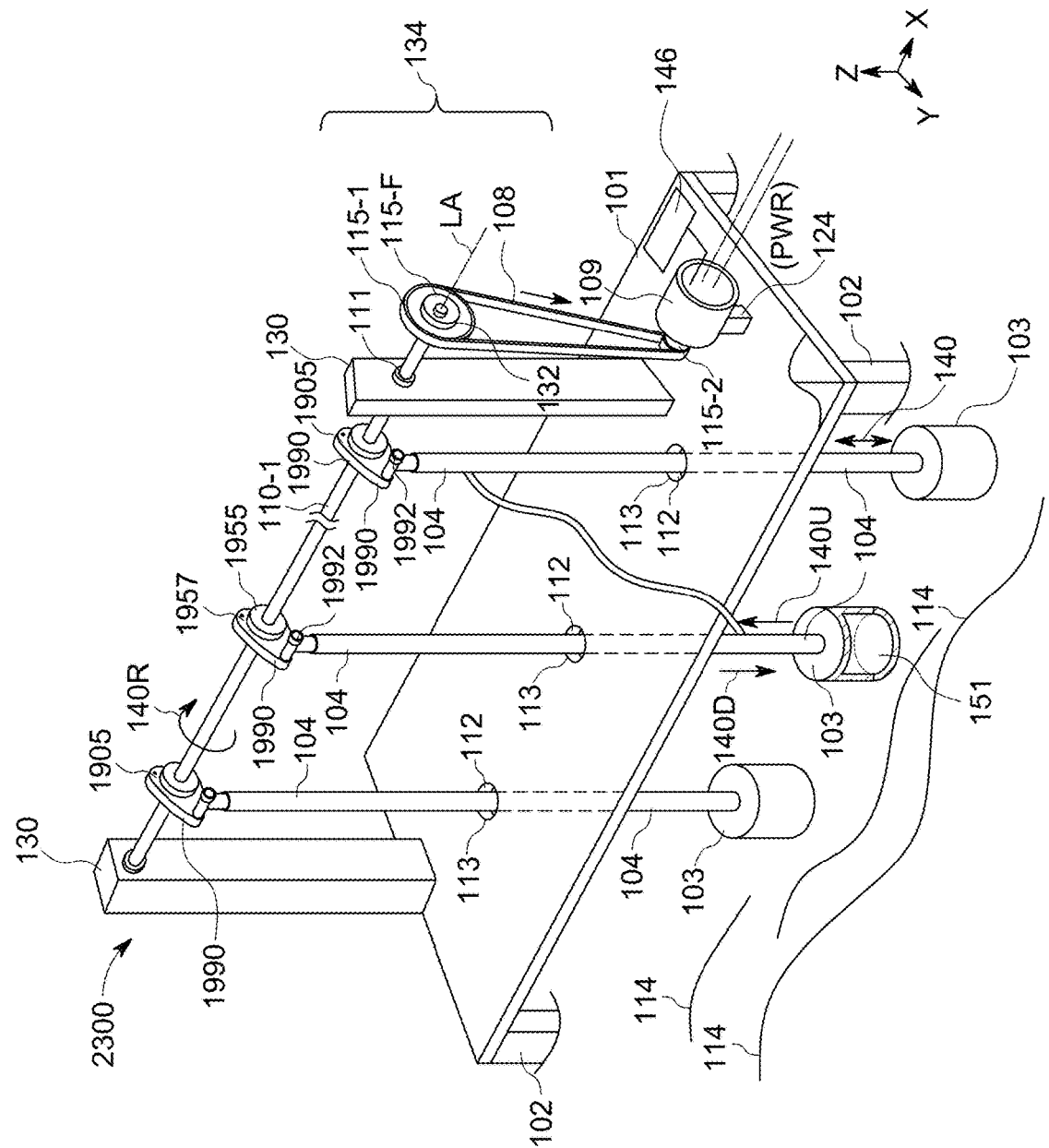
FIG. 23 shows a front side perspective view of a portion of a WPGS including an LDS in accordance with embodiments of the present system.

For example, FIG. 23 shows a front side perspective view of a portion of a WPGS 2300 including an LDS in accordance with embodiments of the present system. The LDS shown in FIG. 23 is similar to that shown in FIG. 1 but has a single shaft 110-1, instead of the two shafts 110-1, 110-2 of the LDS shown in FIG. 1. Hubs 1955 may be coupled to offset pins such as crankpins. A single shaft 110-1 may be employed. Sprockets 1905 may each include a rotor 1957 coupled to a hub 1955 via an overrunning clutch (e.g., a freewheel, a sprag clutch, etc.) such that rotors 1957 may only drive their corresponding hubs 1955 in a first direction (e.g., in direction 140R) and may overrun in the other direction. Each of the crankpins 1992 may be coupled to the rotor 1957 via a web 1990. The BUDs 104 may be coupled to the crankpins 1992. In some embodiments, crankpins include pins of a clevis coupler.

Figure 24:
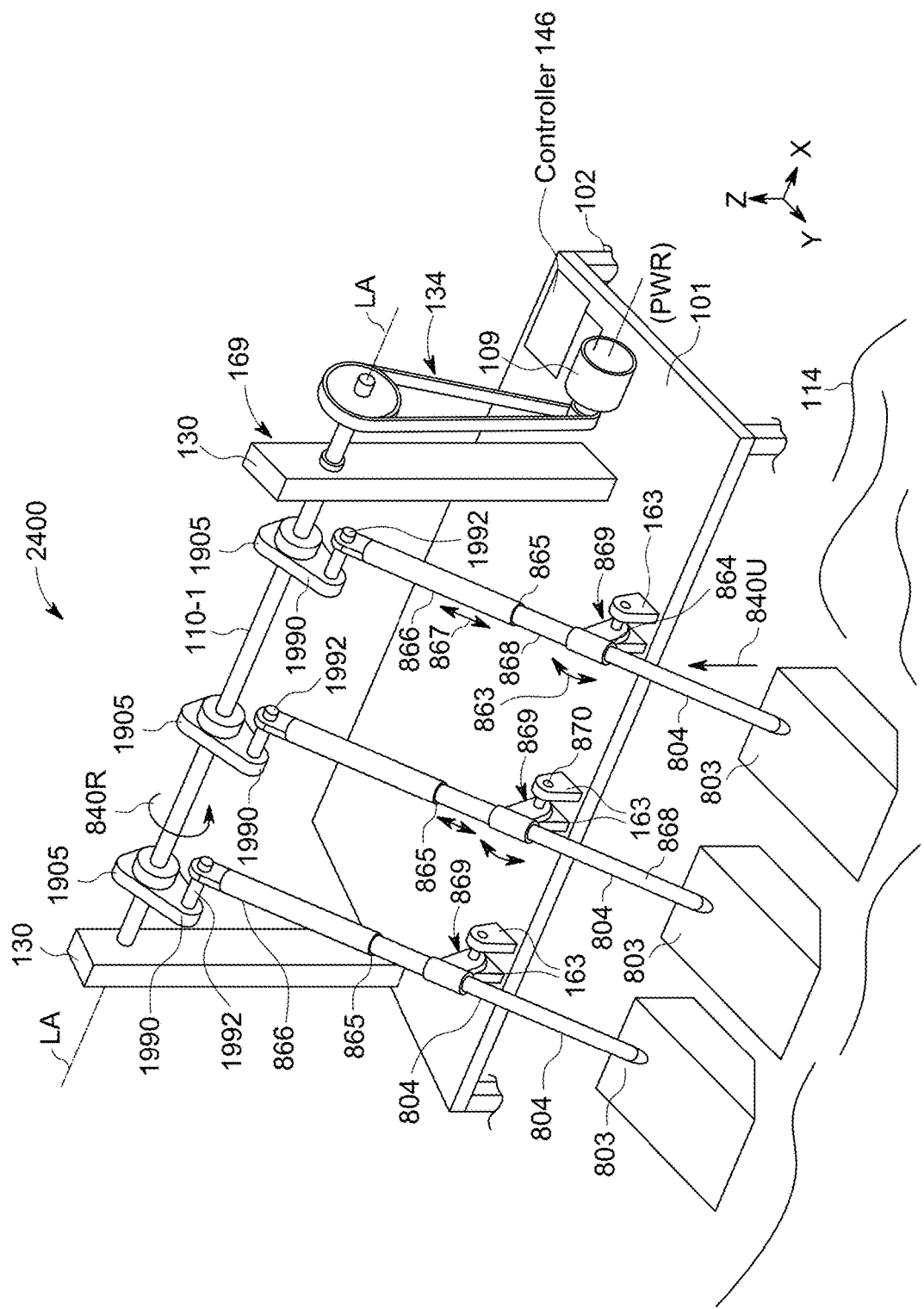
FIG. 24 shows a front side perspective view of a portion of a WPGS including LEDS in accordance with embodiments of the present system.

FIG. 24 shows a front side perspective view of a portion of a WPGS 2400 including LEDS in accordance with embodiments of the present system. The LEDS shown in FIG. 24 is similar to that shown in FIG. 8 but has a single shaft 110-1, instead of the two shafts 110-1, 110-2 of the LEDS shown in FIG. 8. BUDS 804 may be coupled to an offset pin to drive the shaft 110-1 using any suitable arrangement such as via corresponding crankpins 1992 coupled to the shaft 110-1 via an overrunning clutch such that the shaft 110-1 is rotated in a single direction as illustrated by arrow 840R.

Figure 25:
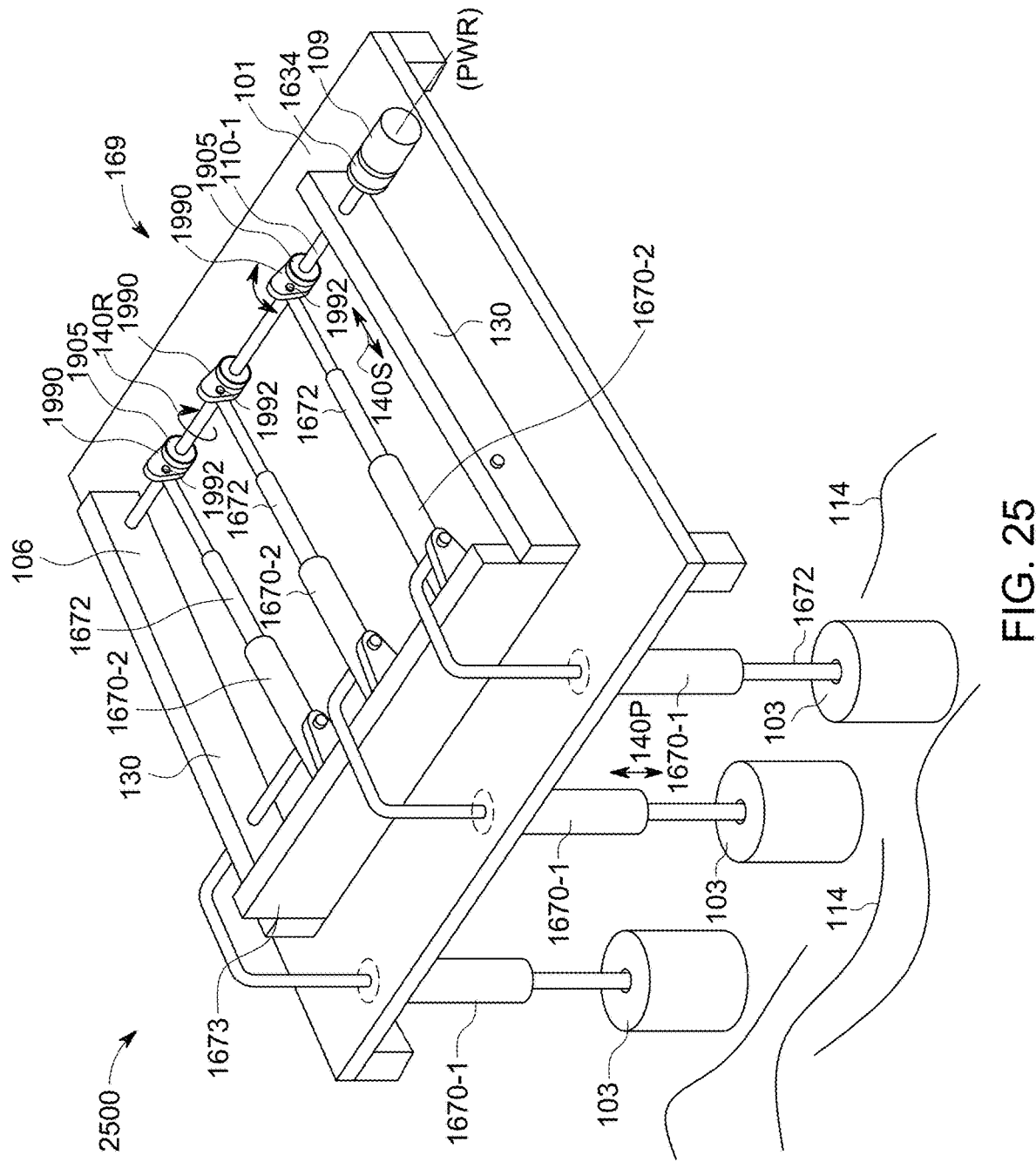
FIG. 25 shows a front side perspective view of a portion of a WPGS including LEDS in accordance with embodiments of the present system.
Figure 26:
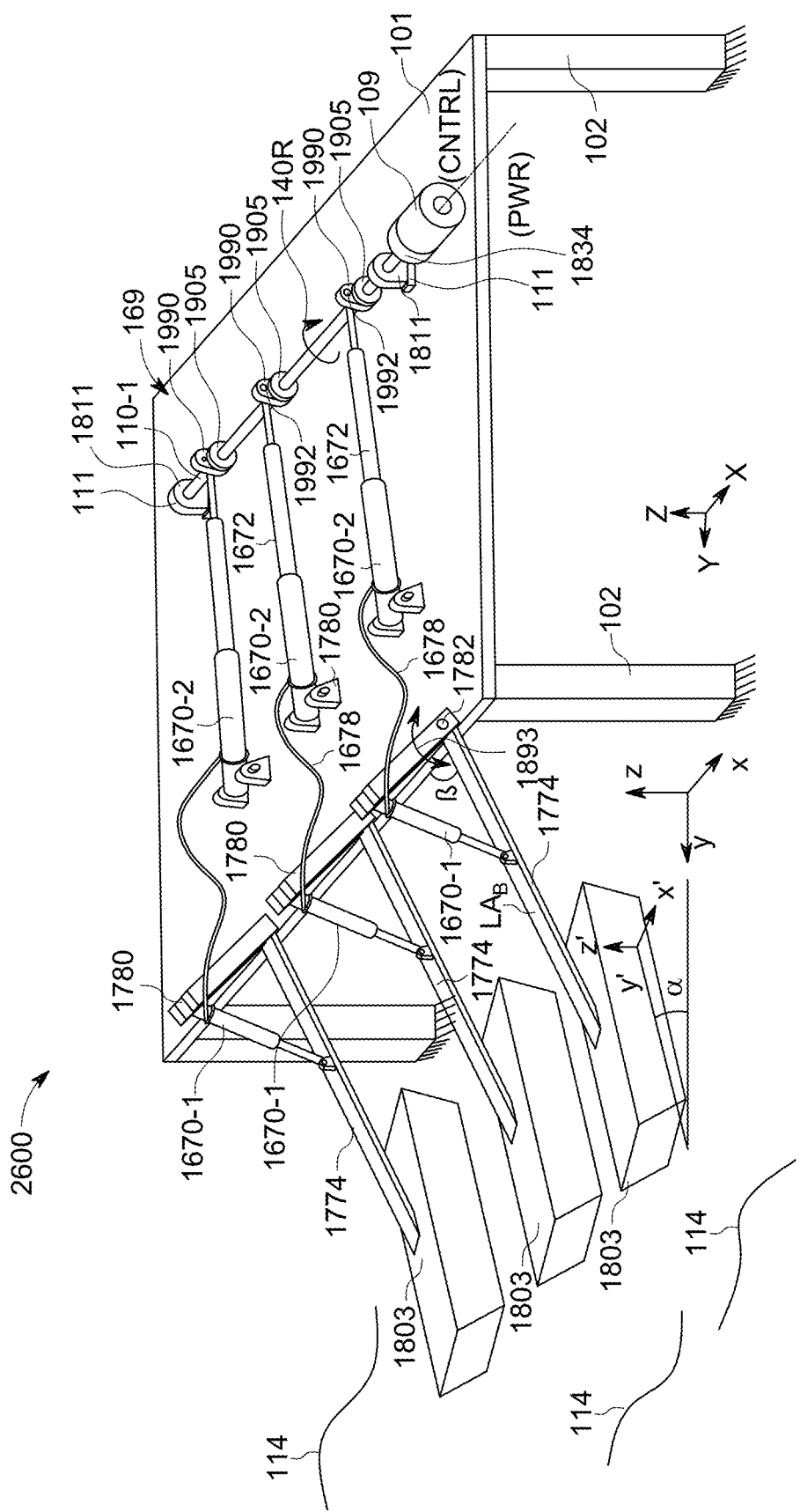
FIG. 26 shows a front side perspective view of a portion of a WPGS including LEDS in accordance with embodiments of the present system.
Figure 27:
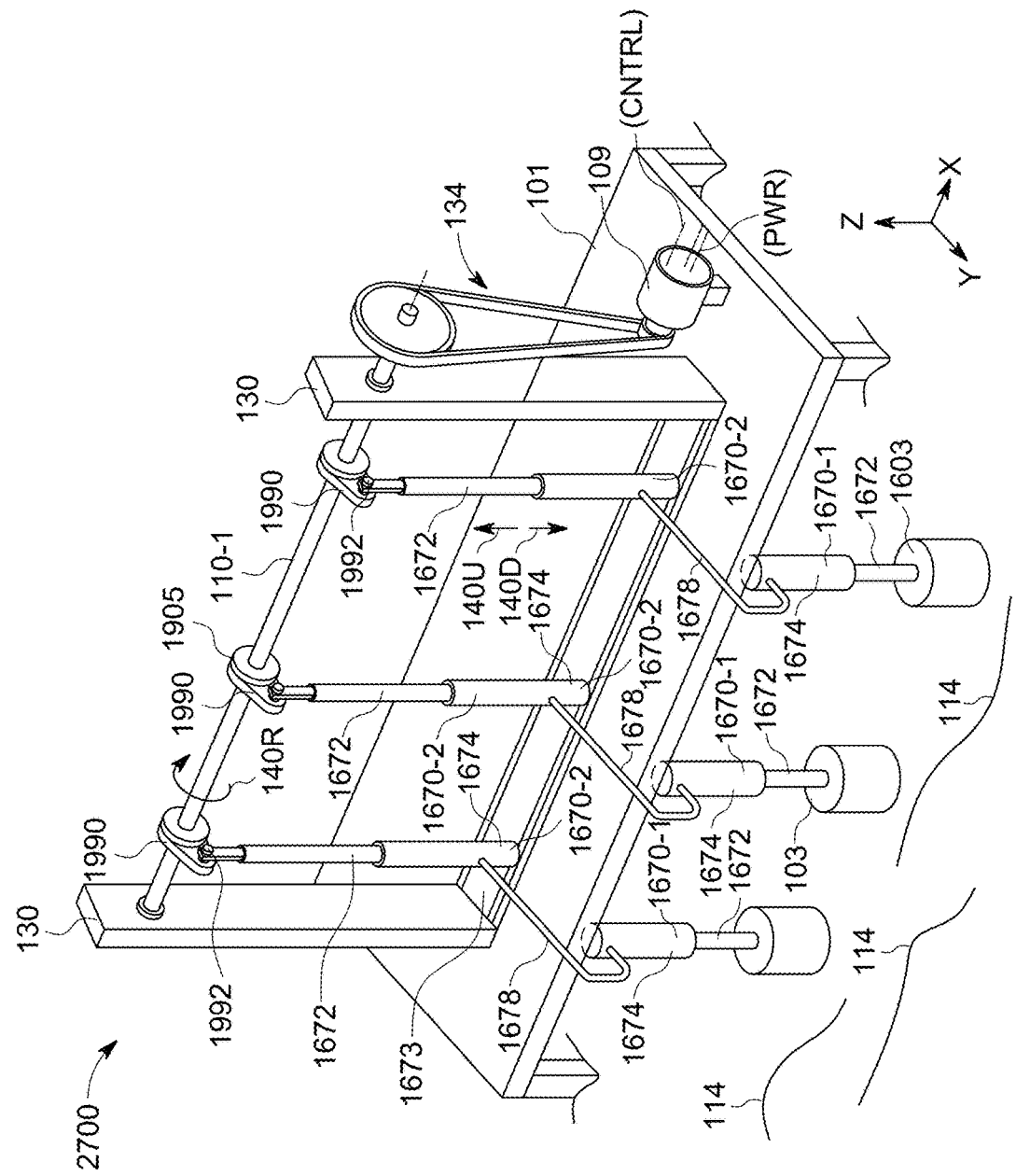
FIG. 27 shows a front side perspective view of a portion of a WPGS including LEDS in accordance with embodiments of the present system.
Figure 28:
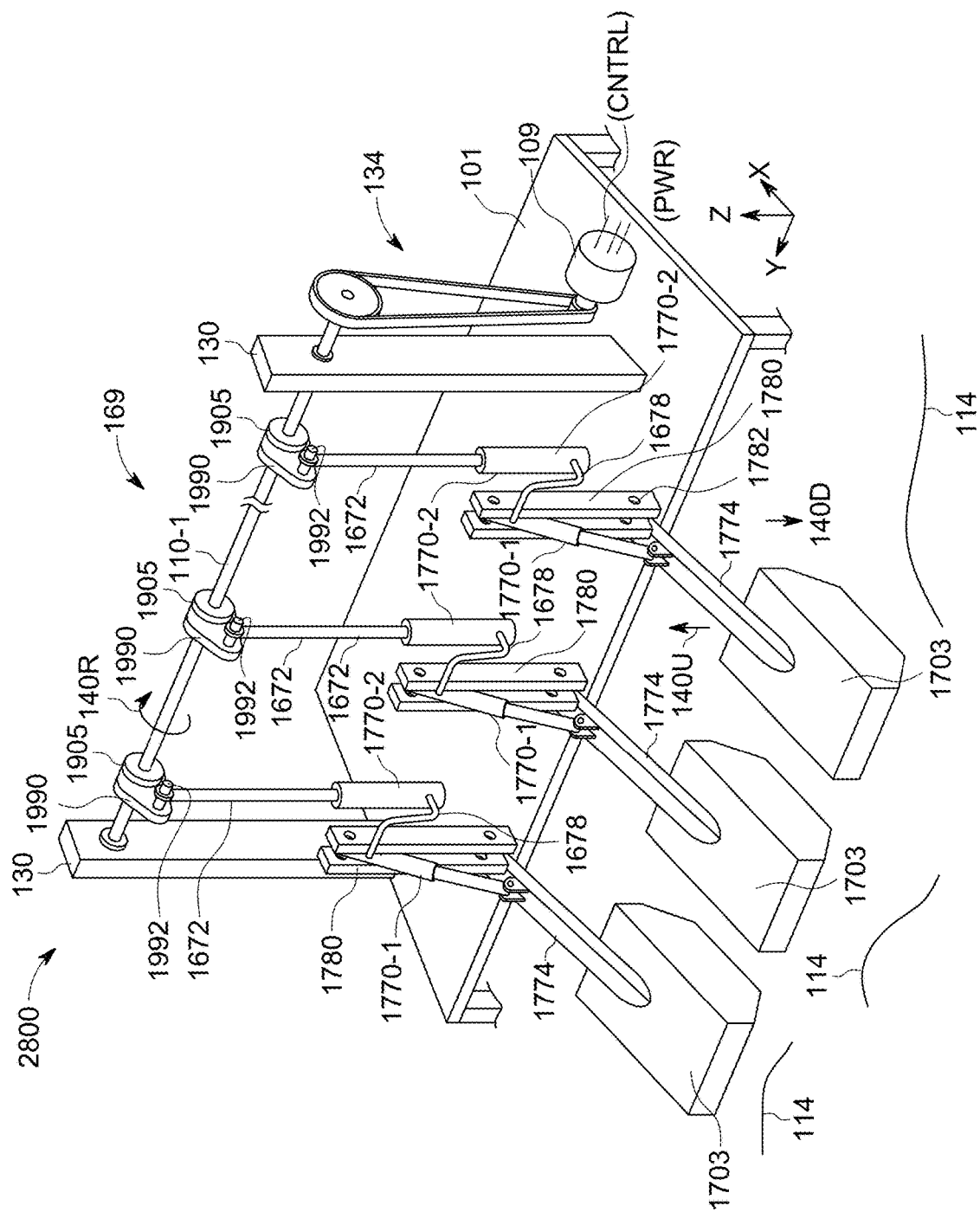
FIG. 28 shows a front side perspective view of a portion of a WPGS including LEDS in accordance with embodiments of the present system.

In accordance with some embodiments, the secondary hydraulic cylinders 866 (which may be similar to the secondary hydraulic cylinders 1970-2 shown in FIG. 19) may be coupled to sprockets or freewheels 1905 of the first shaft 110-1 using corresponding offset pins 1992 (e.g., a crank pins) in a similar manner as that shown in FIG. 19 where offset pins 1922 couple the secondary hydraulic cylinders 1970-2 to sprockets or freewheels 1905 of the first shaft 110-1. Several embodiments using such as configuration will now be shown and described with reference to FIGS. 25 through 28; where FIG. 25 shows a front side perspective view of a portion of a WPGS 2500 including LEDS in accordance with embodiments of the present system; FIG. 26 shows a front side perspective view of a portion of a WPGS 2600 including LEDS in accordance with embodiments of the present system; FIG. 27 shows a front side perspective view of a portion of a WPGS 2700 including LEDS in accordance with embodiments of the present system; and FIG. 28 shows a front side perspective view of a portion of a WPGS 2800 including LEDS in accordance with embodiments of the present system.

With reference to FIGS. 25 through 28, the secondary hydraulic cylinders 1670-2 (or 1770-2 of FIG. 28) may be coupled to sprockets or freewheels 1905 of the first shaft 110-1 using corresponding offset pins 1992 (e.g., a crank pins). Accordingly, when cycled through an extension-retraction cycle (e.g., where the piston extends and retracts from the barrel of the cylinder 1670-2 as in other embodiments of the present system), the secondary hydraulic cylinders 1670-2 may partially rotate the crankpin 1992 about a longitudinal axis (LA) of the first shaft 110-1. During this cycle, when the crankpin rotates the corresponding freewheel 1905 in the direction of arrow 140R, an overrunning clutch of the corresponding freewheel 1905 may lock and the crankpin may rotate the first shaft 110-1 in the direction of arrow 940R about the longitudinal axes (LA). The generator 109 may then be driven by the first shaft 110-1 coupled thereto. However, when the crankpin rotates the corresponding freewheel 1905 in the direction opposite of arrow 140R, an overrunning clutch of the corresponding freewheel 1905 may open and the crankpin may not rotate the first shaft 110-1. The generator 109 may then be driven by the first shaft 110-1 coupled thereto via the transmission 134. The generator 109 may be assumed to include a flywheel as described elsewhere in this application. For the sake of clarity, it will be assumed that when the corresponding buoys of the embodiments rise, the first hydraulic cylinders compress and transfer hydraulic fluid to the second hydraulic cylinders which then expand accordingly and vice versa. Piston area and stroke of the hydraulic cylinders may be varied as desired.

Figure 29:
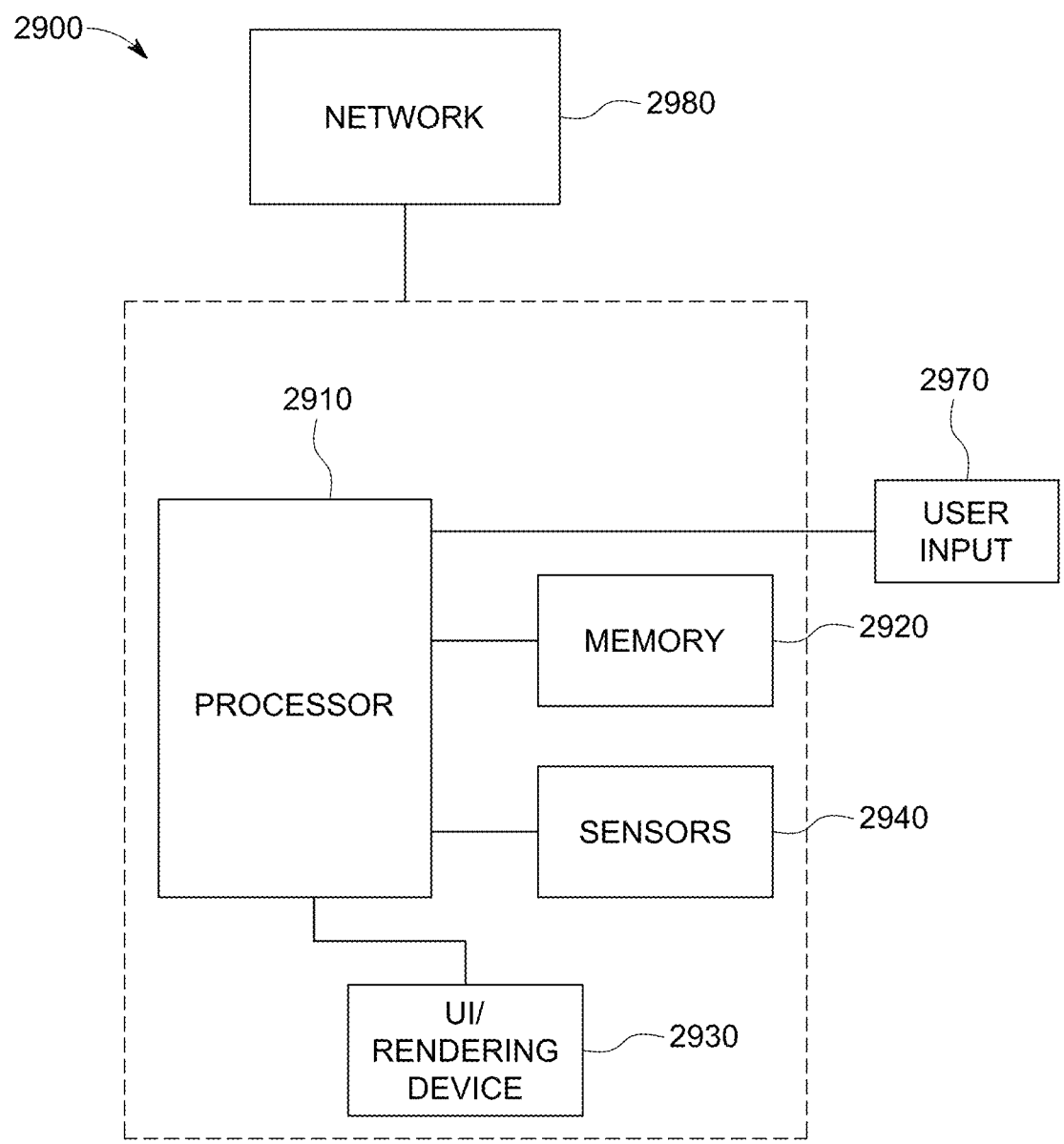
FIG. 29 shows a portion of a system in accordance with embodiments of the present system.

FIG. 29 shows a portion of a system 2900 in accordance with embodiments of the present system. For example, a portion of the present system may include a processor 2910 (e.g., a controller such as the controller 146, 1646) operationally coupled to a memory 2920, a user interface (UI) including a rendering device such as a display 2930, sensors 2940, and a user input device 2970. The memory 2920 may be any type of device for storing application data as well as other data related to the described operation. The application data and other data are received by the processor 2910 for configuring (e.g., programming) the processor 2910 to perform operation acts in accordance with the present system. The processor 2910 so configured becomes a special purpose machine particularly suited for performing in accordance with embodiments of the present system.

The processor 2910 may render the content such as still or video information on a UI of the system. This information may include information related to operating parameters, instructions, feedback, and/or other information related to the operation of a the system or portions thereof. The sensors 2940 may include sensors of the wave power generator or portions thereof and may sense related parameters, form sensor information, and provide this sensor information to the processor 2910.

The user input 2970 may include a keyboard, a mouse, a trackball, or other device, such as a touch-sensitive display, which may be stand alone or part of a system, such as part of a laptop, a personal digital assistant (PDA), a mobile phone (e.g., a smart phone), a smart watch, a smart phone, an e-reader, a monitor, a smart or dumb terminal or other device for communicating with the processor 2910 via any operable link such as a wired and/or wireless communication link. The user input device 2970 may be operable for interacting with the processor 2910 including enabling interaction within a UI as described herein. Clearly the processor 2910, the memory 2920, display 2930, and/or user input device 2970 may all or partly be a portion of a computer system or other device such as a client and/or server device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 2020 or other memory coupled to the processor 2910.

The program and/or program portions contained in the memory 2920 may configure the processor 2910 to implement the methods, operational acts, and functions disclosed herein. The memories may be distributed, for example between the clients and/or servers, or local, and the processor 2910, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 2910. With this definition, information accessible through a network is still within the memory, for instance, because the processor 2910 may retrieve the information from the network for operation in accordance with the present system.

The processor 2910 is operable for providing control signals and/or performing operations in response to input signals from the user input device 2970 as well as in response to other devices of a network and executing instructions stored in the memory 2920. The processor 2910 may include one or more of a microprocessor, an application-specific and/or general-use integrated circuit(s), a logic device, etc. Further, the processor 2910 may be a dedicated processor for performing in accordance with the present system and/or may be a general-purpose processor wherein only one of many functions operates for performing in accordance with the present system. The processor 2910 may operate utilizing a program portion, multiple program segments, and/or may be a hardware device utilizing a dedicated or multi-purpose integrated circuit.

The processor 2910 may be operable to control one or more wave power devices and/or systems. Similarly, the processor 2910 may be operable to control a power system, a charging system, and/or a braking system of a wave power device operating in accordance with embodiments of the present system.

Wave Power Drive Platform (AWDP)

Figure 30:
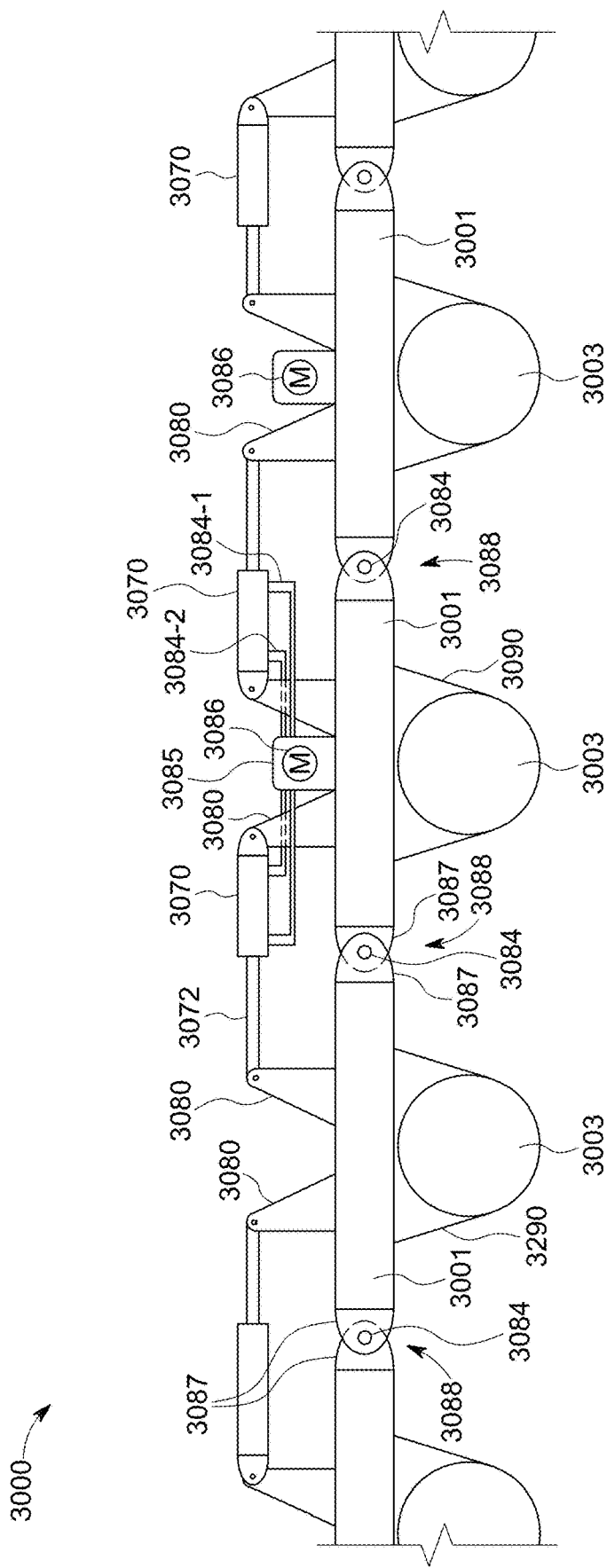
FIG. 30 shows a side view of a portion of an AWDP generator system in accordance with embodiments of the present system.
Figure 31:
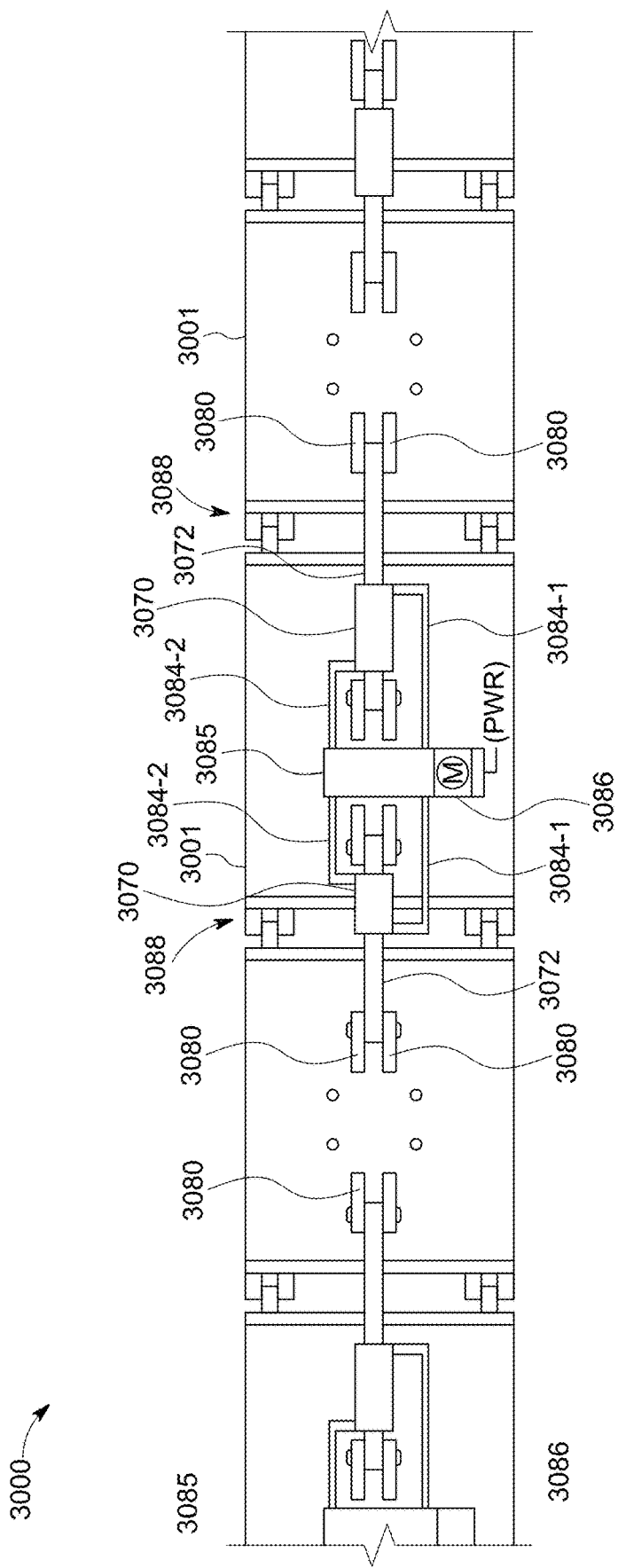
FIG. 31 shows a top view of a portion of the AWDP system in accordance with embodiments of the present system.
Figure 32:
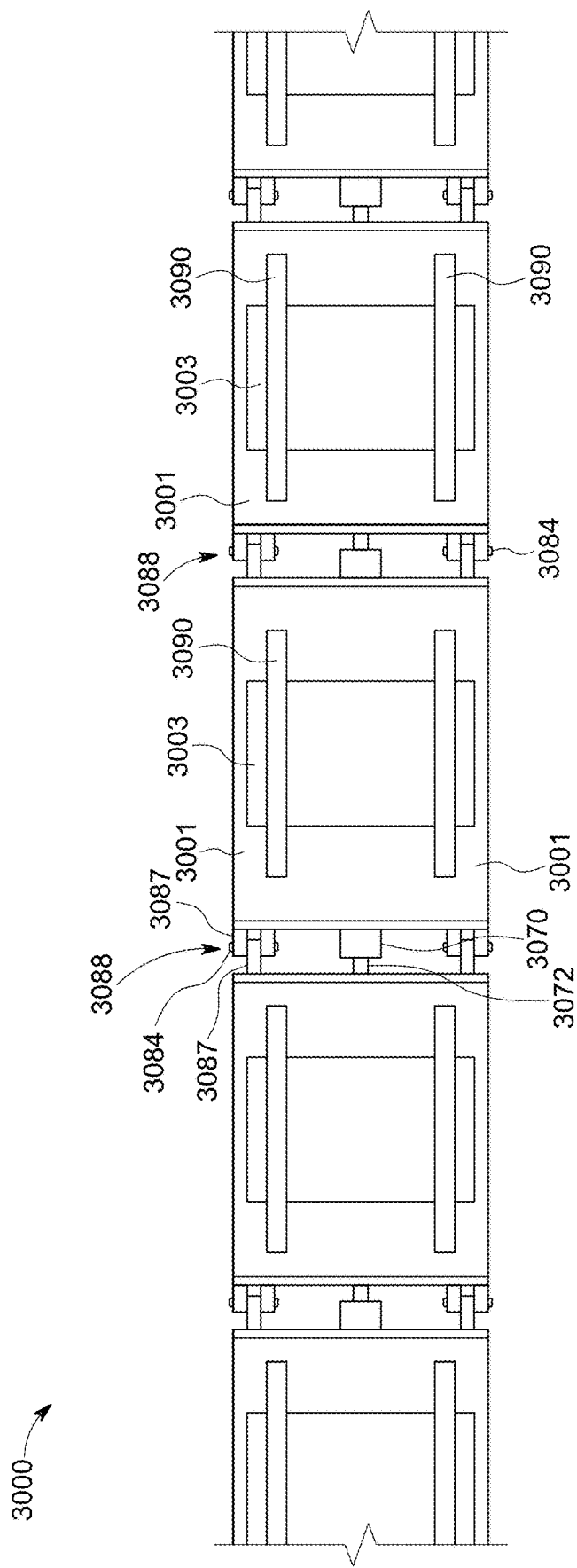
FIG. 32 shows a bottom view of a portion of the AWDP system in accordance with embodiments of the present system.

In some embodiments, a plurality of articulating platforms may be coupled by one or more articulating joints and primary hydraulic cylinders supported by adjacent platforms supported by buoys. For example, FIG. 30 shows a side view of a portion of an AWDP generator system (hereinafter AWPD system) 3000 in accordance with embodiments of the present system; FIG. 31 shows a top view of a portion of the AWDP system 3000 in accordance with embodiments of the present system; FIG. 32 shows a bottom view of a portion of the AWDP system 3000 in accordance with embodiments of the present system; and FIG. 33 shows a side view of a portion of the AWDP system 3000 articulating with waves 3014 in accordance with embodiments of the present system.

With reference to FIG. 30, the AWDP system may include a plurality of platforms 3001 coupled together and each supported by a buoyant body such as buoys 3003 which may include, for example, drums, barrels, cylinders, pontoons, and/or the like that may be coupled to, or formed integrally with, the corresponding platform 3001. The other side view may be similar.

Figure 33:
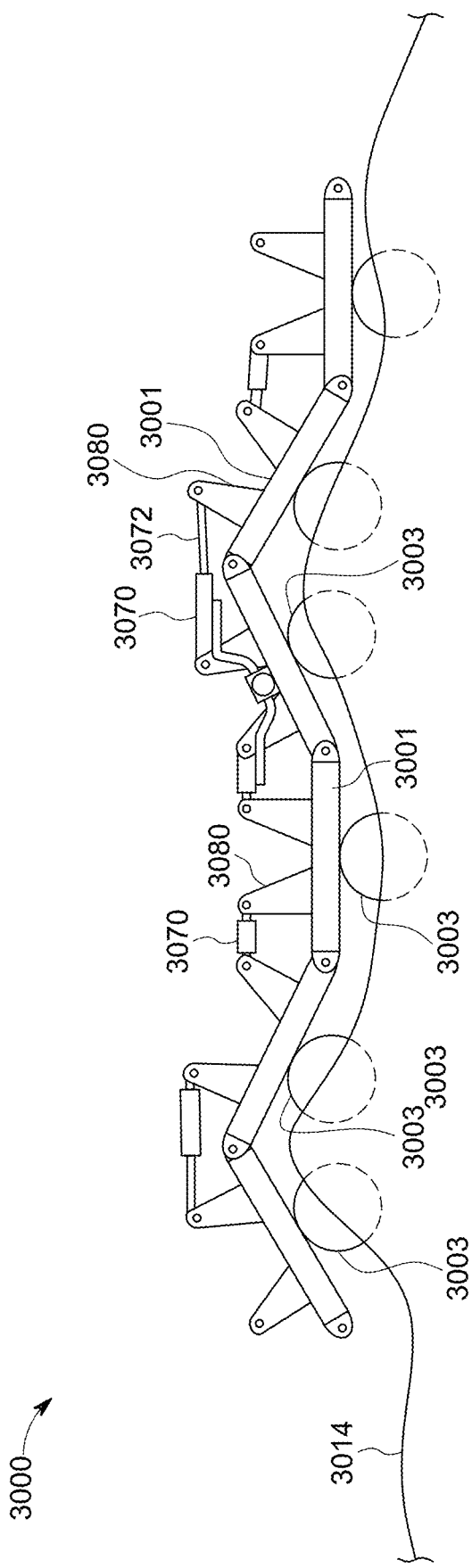
FIG. 33 shows a side view of a portion of the AWDP system articulating with waves in accordance with embodiments of the present system.

Adjacent platforms 3001 may be coupled together using any suitable coupler such as hinges 3088 which may be coupled to, or formed integrally with, the corresponding platforms 3001 so as to provide for articulation (e.g., as shown in FIG. 33) at least about pins 3084 of the corresponding hinges 3088 which may extend through knuckles 3087 of the hinges 3088. The buoys 3003 may be coupled to the platforms using any suitable coupler such as one or more straps 3090. However, in yet other embodiments, it is envisioned that the buoys may be formed integrally with the platforms 3001. Similarly, it is envisioned that knuckles of the hinges may be formed integrally with the platforms. In some embodiments, coatings may be applied to the hinges to reduce friction if desired.

The platforms 3001 may include supports 3080 that may be configured to be coupled to an adjacent end of a corresponding one of the hydraulic cylinders 3070. The supports 3080 may be coupled to one or more of the hydraulic cylinders 3070 using any suitable coupler such as clevis type fasteners or the like which may provide for one or more degrees of motion between the support 3080 and a corresponding one of the hydraulic cylinders 3070 coupled thereto. In some embodiments, the hydraulic cylinders may be coupled to the supports using one or more arms which may provide for one more additional degrees of freedom if desired.

The hydraulic cylinders 3070 may be double acting and include a body defining a cavity filled with a hydraulic fluid such as oil. A piston may be situated within the cavity and coupled to a corresponding piston rod 3072 may be configured to pump the hydraulic fluid through first and second ports respectively located at ends of the body such that they may be on opposite sides of the piston and flow of the hydraulic fluid through the first and second ports may be opposite. The first and second ports may be coupled to a hydraulic fluid controller 3085 via lines 3084-1 and 3084-2, respectively, which may be flexible.

The hydraulic fluid controller 3085 may direct high pressure hydraulic fluid from a high-pressure port of the first and second ports to a hydraulic motor 3086 which may then drive an electrical generator coupled thereto. In the present embodiments, the electrical generator may be integrated with the hydraulic motor 3086 such that an output shaft of the hydraulic motor 3086 may drive an input shaft of the electrical generator. Hydraulic fluid returned from the hydraulic motor 3086 may be routed by the hydraulic fluid controller 3085 to a low-pressure port of the first and second ports. As the piston move in and out of the cavity the high- and low-pressure ports may reverse. The hydraulic fluid controller 3085 may include on or more accumulators to accumulate excess hydraulic fluid to control pressure as may be desired.

The electrical generator may generate electrical power under the control of a controller and may output this power via an electrical outlet port to mains and/or an energy storage system such as a battery which may be coupled to one or more of the platforms 3001 and may receive power from one or more of the electrical generators.

Figure 34:
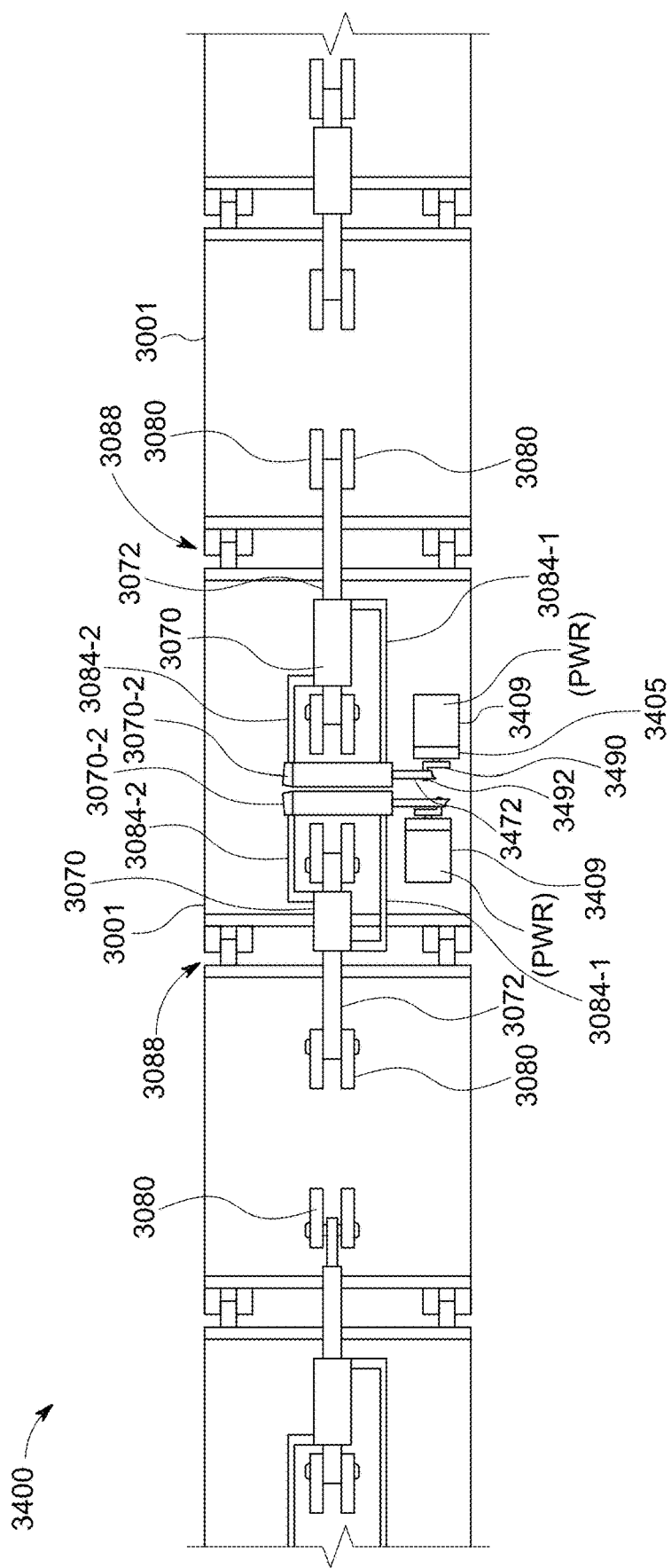
FIG. 34 shows a top view of a portion of a further AWDP system in accordance with embodiments of the present system.

FIG. 34 shows a top view of a portion of an AWDP system 3400 (hereinafter system) in accordance with embodiments of the present system. The system 3400 may be similar to the system 3000 of FIG. 31. The hydraulic cylinders 3070 may be coupled to one or more secondary hydraulic cylinders 3070-2 so as to drive a piston 3072 of the secondary hydraulic cylinder 3072-2. The piston 3072 may be coupled to a crankpin 3492 of a web 3490 (e.g., forming a crankshaft) that may be coupled to an overrunning clutch 3405. The overrunning clutch 3405 may transmit power to an input shaft of a generator 3409 via a first shaft. Accordingly, the generator 3409 may be driven by reciprocating motion of the piston 3072 via the overrunning clutch 3405 and the first shaft which may be coupled to or formed integrally with the input shaft of the generator 3409. The generator 3409 may then output power (PWR). In accordance with some embodiments, the overrunning clutch 3405 may drive the generator 3409 in a single direction. However, in yet other embodiments, the overrunning clutch 3405 may be set to drive the generator 3409 in dual directions. Each of the hydraulic cylinders 3070 may drive one or more generators 3409 via at least a corresponding secondary cylinder 3070-2.

While the drive generator 3409 is coupled directly to the first shaft, it may also be coupled to the first shaft via a transmission as discussed elsewhere in this application. It should also be appreciated that the secondary cylinders may be coupled to, and drive a single or dual shaft and a chain as shown in the hybrid drive system with the vertical drive portion (e.g., see drive portion (DP) 169 including shafts, sprockets, and DFTMs/chains/belts) of FIG. 16A or the horizontal drive configuration (169) of FIG. 16B. Thus, the secondary cylinders may be arranged to drive the generator using any suitable arrangement as discussed elsewhere in this application. Thus, the secondary cylinders may be coupled to a horizontal or vertical drive portions as may be desired.

Accordingly, embodiments of the present system may provide a system in which monitoring the state of charge of a batteries and providing for the system and/or user to control a charging rate and/or mode. A Bluetooth™ or Wi-Fi™ link between the rendering device 2930 (e.g., a display) and the system may enable rendering of system parameters on a UI of the rendering device 2930 which may also provide an entry area in which a user may change parameters such as charging rate, etc. of the system. Additionally, this link may be configured to link two or more hydro wave powered devices using a two-way connection. With this connection, the battery system parameters may be rendered and its charging rates and times may be adjusted. Parameters such as bearing temperature, voltages, charge/discharge amperage, and any related alarms from the towed vehicle may be rendered on within the UI for the convenience of the user such as an operator monitoring and/or setting control parameters of the system. Through the UI, the user may interact to select and/or change parameters such as selecting a rate of charge for the battery, setting charge and discharge of the battery, and/or communicating with a mains supplier of electricity. It is envisioned that the system may include a controller to monitor its battery voltage and temperature. Information may be rendered on the UI to notify a controller of the system and/or the user when the battery has reached a desired charge and the processor may automatically taper down charging prior to the desired charge and/or shutdown charging operations of the system when the desired charge is reached. The controller of the system may further monitor demand of the system and may shut down operations and/or control the generator to reduce power generation. In some embodiments, the controller may control actuators of the system to disconnect one or more portions of the system such as clutches of the system to reduce or prevent power generation.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, any section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts or steps is intended to be required unless specifically indicated;
i) the term "plurality of" an element includes two or more of the claimed element, and does not imply any particular range of number of elements; that is, a plurality of elements may be as few as two elements, and may include an immeasurable number of elements; and
j) the term and/or and formatives thereof should be understood to mean that only one or more of the listed elements may need to be suitably present in the system in accordance with the claims recitation and in accordance with one or more embodiments of the present system.

INDEX OF ACRONYMS

Buoy Drive Shaft (BUDS)
Buoy Support Arm (BSA)
Cantilever Drive System (CEDS)
Continuously Variable Transmission (CVT)
Control Line (CNTRL)
Drive Coupler (DC)
Drive Portion (DP)
Drive Force Transmitting Member (DFTM)
Force Transmitting Member (FTM)
Hybrid Drive Systems (HDS)
Hydraulic Wave-Power Generator System (HWPGS)
Lever Drive System (LEDS)
Linear Drive System (LDS)
Longitudinal Axis (LA)
Personal Digital Assistant (PDA)
Power Output (PWR)
Revolutions per Minute (RPM)
Slide Bearing (SB)
User Interface (UI)
Wave-Power Generator System (WPGS)

What is claimed is:

1. A wave power harnessing device, comprising:
a base configured to support at least one guide opening;
first and second shafts situated apart and parallel from each other and to the base;
first and second sprockets coupled to the first and second shafts, respectively, the first and second sprockets each having an overrunning clutch configured to rotate the shaft coupled thereto in a single direction;
a force transmitting member (FTM) coupled to the first and second sprockets;
at least one buoy drive shaft (BUDS) coupled to the FTM and to at least one buoy;
a drive coupler (DC) configured to couple the BUDS to the FTM, wherein the DC is configured to allow pivotable movement of the BUDS pivoting about the DC; and
a generator coupled to at least one of the first and second shafts and configured to generate an electrical power.

2. The device of claim 1, further comprising a guide bearing situated in the at least one guide opening configured to provide for telescopic motion of the BUDS.

3. The device of claim 1, wherein the BUDS is oriented in a substantially vertical position and telescopes relative to the base.

4. The device of claim 2, wherein the guide bearing and the drive coupler are configured to constrain the BUDS to a substantial vertical orientation.

5. The device of claim 1, wherein the first and second sprockets and the BUDS are substantially parallel with each other.

6. The device of claim 1, wherein the FTM comprises at least one of a chain, a belt, and a cable.

7. The device of claim 1, further comprising a controller having a battery management portion for controlling storage of the electrical power in a battery.

8. The device of claim 1, wherein the DC and the FTM form including the DC forms a loop about the first and second shafts.

9. The device of claim 1, the DC includes a heim joint having a rod and a bearing.

10. The device of claim 1, wherein DC includes a flexible joint.

11. The device of claim 1, further comprising a controller configured to control the overrunning clutch.

12. A wave power harnessing device, comprising:
first and second shafts situated apart;
a base configured to support the first and second shafts;
first and second sprockets coupled to the first and second shafts, respectively, the first and second sprockets each having an overrunning clutch configured to rotate the shaft coupled thereto in a single direction;

a force transmitting member (FTM) coupled to the first and second sprockets;

at least one buoy drive shaft (BUDS) coupled to the FTM and to at least one buoy;

a drive coupler (DC) configured to couple the BUDS to the FTM, wherein the DC is configured to allow pivotable movement of the BUDS pivoting about the DC; and a generator coupled to at least one of the first and second shafts and configured to generate an electrical power.

13. The device of claim 12, wherein the DC includes a heim joint having a rod and a bearing.

14. The device of claim 12, wherein the DC includes a flexible joint.

15. The device of claim 12, further comprising a controller configured to control the overrunning clutch.

16. The device of claim 12, further comprising a controller having a battery management portion for controlling storage of the electrical power in a battery.

17. The device of claim 12, further comprising a slide bearing situated in at least one guide opening of the base, wherein the slide bearing is configured to provide telescopic motion of the BUDS.

18. The device of claim 12, further comprising a bearing situated in at least one guide opening of the base, wherein the bearing includes rollers configured to allow telescopic motion of the BUDS through the at least one guide opening.

19. The device of claim 12, further comprising a seal situated in at least one guide opening of the base, wherein the seal is configured to allow searingly telescopic motion of the BUDS through the at least one guide opening.

* * * * *